US006643712B1

(12) United States Patent
Shaw et al.

(10) Patent No.: US 6,643,712 B1
(45) Date of Patent: Nov. 4, 2003

(54) VALIDATING THE CREATION OF AND ROUTING OF MESSAGES TO FILE OBJECTS

(75) Inventors: George H. J. Shaw, Woodinville, WA (US); Bryan A. Woodruff, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/488,080

(22) Filed: Jan. 20, 2000

Related U.S. Application Data

(63) Continuation-in-part of application No. 09/452,039, filed on Nov. 30, 1999, now abandoned, which is a continuation of application No. 08/826,644, filed on Apr. 4, 1997, now Pat. No. 6,016,515.

(51) Int. Cl.[7] .............................................. G06F 13/10
(52) U.S. Cl. ....................... 709/321; 717/100; 717/120; 709/313; 707/200
(58) Field of Search ................................ 717/100, 105, 717/120, 121; 707/200, 205; 709/310–318, 327, 321

(56) References Cited

U.S. PATENT DOCUMENTS

| 5,463,774 A | 10/1995 | Jenness | 395/600 |
| 5,615,363 A | 3/1997 | Jenness | 395/614 |
| 5,694,563 A | 12/1997 | Belfiore et al. | 395/352 |
| 5,815,689 A | 9/1998 | Shaw et al. | 395/551 |
| 5,886,699 A | 3/1999 | Belfiore et al. | 345/352 |
| 5,903,894 A | 5/1999 | Reneris | 707/100 |
| 5,950,000 A | * 9/1999 | O'Leary et al. | 717/105 |
| 6,256,774 B1 | * 7/2001 | O'Leary et al. | 717/120 |

OTHER PUBLICATIONS

Nelson et al., "The Spring File System", Sun Microsystems Laboratories, Inc., pp. 1–27, Feb. 1993.*
Stevens, Al, "C Programming," Dr. Dobb's Journal, pp. 15 (Nov. 1992).

* cited by examiner

*Primary Examiner*—St. John Courtenay, III
(74) *Attorney, Agent, or Firm*—Workman, Nydegger

(57) ABSTRACT

A method is provided to overcome excess code development associated with developing device drivers that are hierarchically related and provides standardization to driver developers by listing in the private area of a device object types of file objects, including specific IRP handlers associated therewith, that may be created under that device object to thereby provide a device object context. In like manner, each file object has listed in the private area types of other file objects, again including specific IRP handlers associated therewith, that may be created under that particular file object to thereby provide a file object context. The default handler for a driver object points to a multiplexing function that processes an incoming IRP based on the available context information to "route" the IRP to the appropriate handler. Each file object has reference to a plurality of dispatch function references that are used by the IRP handlers to fulfill a particular request. A request to create a file object is also validated to ensure that only file objects of the appropriate type may be created in hierarchy, again according to the context information.

22 Claims, 11 Drawing Sheets

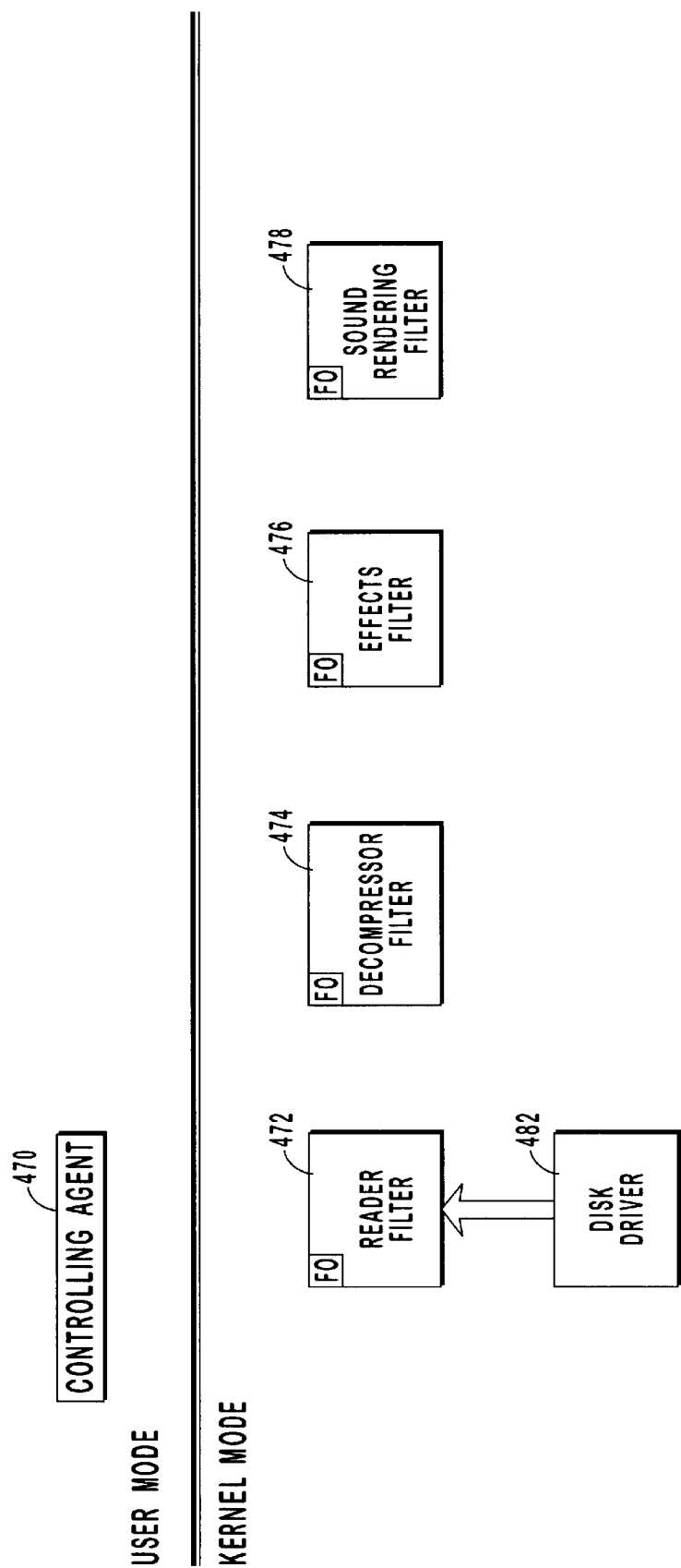

VALIDATING THE CREATION OF AND ROUTING OF MESSAGES TO FILE OBJECTS

RELATED APPLICATION

This application is a continuation-in-part of U.S. patent application Ser. No. 09/452,039, filed Nov. 30, 1999, now abandoned, entitled "Validating the Creation and Routing of Messages to File Object," which is a continuation of Ser. No. 08/826,644, filed Apr. 4, 1999, now U.S. Pat. No. 6,016,515, issued Jan. 18, 2000, entitled "Method, Computer Program Product, and Data Structure for Validating Creation of and Routing Messages to File Objects." The foregoing patent application and patent are incorporated herein by reference.

BACKGROUND OF THE INVENTION

1. The Field of the Invention

The field of the present invention is computer software driver development. The present invention relates to tools, software frameworks, conventions, etc. to simplify code generation of drivers and provide standardized access points. More specifically, the present invention relates to standardized methods, computer program products, and data structures to create hierarchal relationships between file objects.

2. Present State of the Art

A given software driver executable code implementation may have multiple entry points to different portions of functionality. Once loaded and controlled by an operating system such as Microsoft® Windows NT™, specific system objects are created representing the driver (driver objects), the "devices" or specific functional definitions accessible by other components supported by the driver (device objects), and instances of the driver functionality actually used by a component (typically in the form of file objects).

Most operating systems, including Windows NT, implicitly assume that a driver performs a single type of function and that all device objects created in connection with the driver will perform the function in the same manner. Furthermore, created file objects, whether created under the device objects or under other file objects, are assumed to be serviced in the same way. Because of the above mentioned assumptions, the Windows NT operating system and other like operating systems use a single driver object to share all entry points with all sibling device objects created using the same driver object.

As a result of such assumptions, each driver developer must write specific code to validate initial file object requests in systems where hierarchically related file objects may be created according to a specific set of rules. One example of a such a file object hierarchy is the driver connection system described in detail hereafter. This driver connection system is shown by way of example and not by limitation and any other system that makes use of the present invention as hereafter explained will be considered within the scope of the present invention as claimed.

This problem is exacerbated when a standardized system of writing device drivers is used as is found in the driver connection system. Since all driver developers are writing to the same set of rules, not only is specific code required to handle the file object creation but it is developed many times over by each developer writing drivers according to the standardized convention.

Another problem resulting from the basic assumption that all file objects are serviced in the same manner is ensuring that a processing request is routed to the correct handler for a particular file object. Since different functionality can be imparted to a driver, and such functionality is accessed by opening a "file" on the particular device that creates an underlying file object in the system for managing the state of that file and provides a file handle as an access mechanism for directing I/O requests, different processing request handlers are used depending on the file (and file object) designated to receive the request. Special code must normally be written to perform such routing to overcome the assumption of homogenous operation. Again, in a standardized system where multiple different manufacturers may be writing drivers with hierarchically related functionality, the impact is magnified since the special code must be written from scratch multiple times.

What is needed is a standardized mechanism for validating creation requests of file objects in a hierarchically related system of file objects and a way to route processing requests to the correct handler for a given file object.

SUMMARY AND OBJECTS OF THE INVENTION

It is an object of the present invention to provide a standardized mechanism for validating file object create requests based on context information accessible by reference in system device objects and file objects that can be used by multiple third party software driver developers.

It is another object of the present invention to route processing requests to the appropriate handler for a given file object in a standardized fashion to facilitate interoperating device driver development by multiple third party developers.

It is yet another object of the present invention to provide a framework for third party driver developers that reduces the amount of coding effort to develop software drivers and assist in developing drivers that may handle processing requests in a standardized fashion.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method, computer program product, and data structure for validating creation of and routing messages to file objects are provided. There is established a system level convention that all third party software driver developers follow, along with standardized data structures and code that allow easy development of software drivers. These aspects of the invention efficiently provide different types of functionality within the same driver, hierarchically related functionality through validated file object creation, and correct routing of processing messages to the correct handler routines.

The invention extends to a plurality of request handling multiplexing functions, each referenced from the driver object depending on the type of message received (create, I/O control, close, etc.). These multiplexing functions are not developed by the third party developers but rather are provided as part of the system by the system developer or some other entity. The driver developers reap benefits from the standard multiplexing functions by writing software drivers that conform to the established convention and utilize predefined data structures.

According to the present invention, a private storage area in the device objects and the file objects is used to reference predefined data structures that are written by the third party driver developer. The driver developer creates and "fills" the data structures, including writing the specific message handlers that are needed for a particular file object type and message type, without writing any of the code to validate the file object creation or route incoming messages to the correct message handler function. The validation and routing functionality are found in the multiplexing dispatch functions already provided.

For example, a device object private data area references, through a pointer or other means, a validation table data structure containing a table of valid file object types and pointers to appropriate create handlers for creating file objects of the corresponding type. When a create message is received by the create multiplexing dispatch function, the validation table data structure is accessed to determine the validity of the request and, if valid, access the correct create handler.

Should the message indicate that a "parent" file object exists, the create multiplexing dispatch function accesses the parent file object's private data area for a reference to another data structure. The file object data structure contains pointers to all the appropriate message handlers for that particular file object.

With respect to the create message handler, reference is made through a pointer or other means to a validation table data structure containing valid file object types and pointers to appropriate create handlers for creating file objects of the corresponding type. When a create message is received by the create multiplexing dispatch function, the validation table data structure is accessed from the file object data structure to determine the validity of the request and, if valid, access the correct create handler.

Because of the validation tables associated with a file object and a device object, any create request or message may be validated by the create multiplexing dispatch function before being sent to the appropriate create handler. Again, a driver developer is freed from writing the validation code and simply signifies the valid types of file objects in the corresponding data structures either by index ranges or actual type strings used for comparison. If a received message does not correspond to any of the specifically enumerated valid types of file objects, a default or wildcard entry in the validation tables can be invoked, resulting in a default create handler being used or in an error message being generated.

Each file object data structure also contains, as mentioned previously, references to the message handlers for each type of message that pertain to this particular file object. In this manner, the multiplexing dispatch function for a particular message type may route the message to the correct handler for a given file object. Again, the driver developer does not need to write the routing code but can simply use the multiplexing dispatch function and the file object data structure to reference the appropriate message handlers.

In one implementation of the invention, create file object requests can include a pointer to a private data structure defined by the third party driver developer. The private data structure can include parameters or attributes specifically related to the file object type associated with the create request. In this manner, the parameters or attributes included in the private data structure can be passed to the create handler invoked for creating the requested file object, thereby providing an added degree of flexibility or customization for driver developers, while maintaining a standardized framework for file object creation and messaging validation.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 9A and 9B are logical overview diagrams of the kernel mode drivers and connections used to create a chain of kernel mode filters under the direction of a user mode controlling agent to implement a system for reading sound data from a hard drive, processing the data with the kernel mode filters, and rendering the data to be heard through a speaker.

DETAILED DESCRIPTION OF THE PREFERRED EMBODIMENTS

I. Definitions

Figure 1:
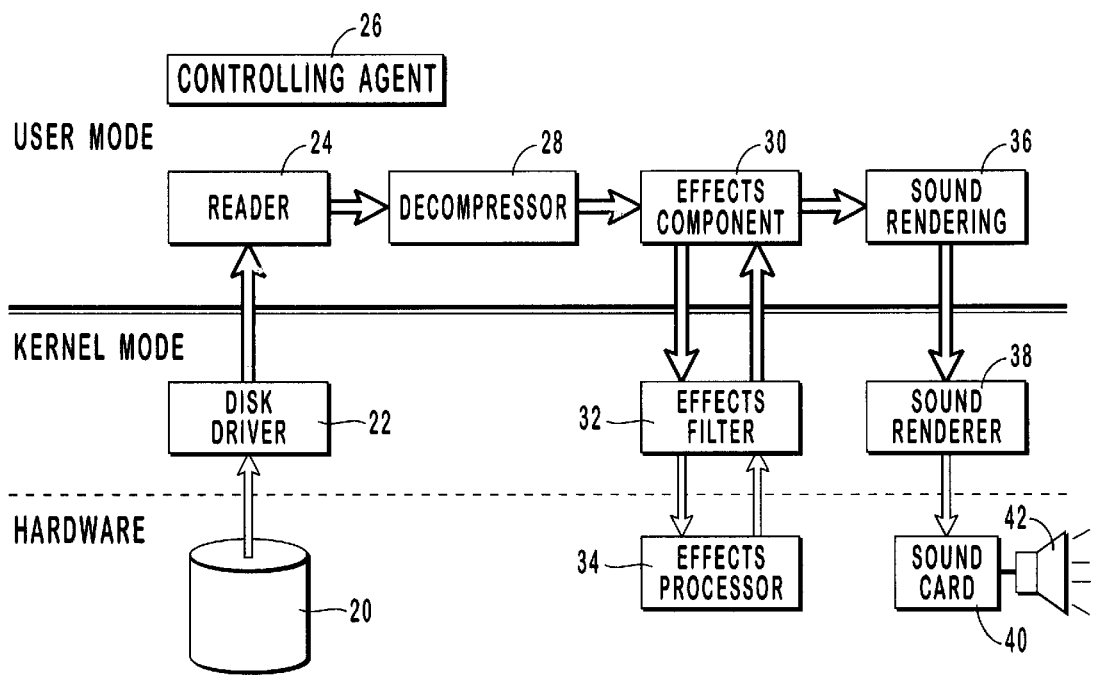
FIG. 1 is a prior art data flow diagram showing a system of interconnected filters and drivers under the direction of a controlling agent for bringing sound data from a disk file, processing the sound data in some form, and rendering the sound data to be played through a speaker.

As used herein, the term "user mode" refers to a level of operation in an operating system where most user written programs run. The user mode level of operation is typically the most secure level and has a significant amount of overhead to prevent one application program or process from interfering with another application program or process. Furthermore, access to system resources is highly controlled through specific interfaces and run priority is generally one of the lowest, if not the lowest.

As used herein, the term "kernel mode" refers to a level of operation in an operating system having significantly less restrictions than the user mode level of operation. Examples of kernel mode programs or processes would include software drivers for controlling hardware components. Typically, kernel mode programs are performance sensitive, and therefore, have less operational overhead than user mode programs. Furthermore, access to hardware and many system resources is unrestricted or much less restricted than for user mode programs. In many instances, program code running in kernel mode relies on programmer discipline and conformity to convention in order to establish good system behavior (e.g., not disrupting another program's address space, etc.). Another term used for kernel mode is "trusted" code.

As used herein the term "driver" refers to software driver programs typically running in kernel mode. The term driver may also refer to the actual executable program that is loaded onto the operating system or a portion thereof that imparts certain functionality. Drivers are in many instances, though not necessarily, associated with some form of hardware.

As used herein, the term "filter" refers to a portion of the functionality found within a software driver, including the entire driver itself, where connection points may be exposed for sending data through the filter. For example, a software driver may support a number of different filters or may have one single function. Furthermore, a number of filters from different drivers that are internally connected together and externally exposing connection points for input and output may collectively be referred to as a single filter. Also, in a more generic sense, the term filter may refer to the operation performed, such as decompression, etc., regardless of whether that occurs in a software driver filter running in kernel mode or another piece of program code running in user mode.

As used herein, the term "driver object" refers to an operating system entity, defined by the operating system, for managing and making known a software driver as a system resource.

As used herein, the term "device object" refers to a system level entity defined by the system, for making known a portion of a drivers functionality available for use as a system resource and defines the driver functionality and availability to other system components. Both the driver objects and device objects are typically created upon loading and initialization of the driver software.

As used herein, the term "file object" refers to an operating system entity, defined by the system, for managing an invocation of a resource specified by a device object. A file object provides a context for usage of a driver object. Furthermore, a file object may be hierarchically related to another file object if the previous file object is designated as a "parent" during the creation of the new file object. File objects are typically used in managing all I/O operations that operate on a stream of data.

As used herein, the term "data" refers to any information that is processed through the interconnected kernel mode filters. Such data includes media data representing video, audio, text, MIDI, etc. but may also include control information or parameters for other applications. For example, a kernel mode filter graph may be used in process control operations where the control information passed between the different filters is used to develop control signals for actuating machinery. While examples are given of media processing systems, other applications could in like manner benefit from the system of interconnected kernel mode filters explained herein.

II. Exemplary Hardware and Software Environment

Throughout this application, the description of the present invention is described within the context of the Windows NT™ operating system available from Microsoft®. Furthermore, familiarity with the Windows NT I/O architecture is presumed in order to understand the preferred embodiment explained herein. A good tutorial of the I/O system as well as the NT operating system in general can be found in the book "Inside Windows NT" written by Helen Custer and published by Microsoft Press and is further incorporated herein by reference.

While the discussion of the drivers and system entities such as file objects, device objects and driver objects are explained herein within the context of how they operate in the Windows NT operating system, those skilled in the art will appreciate that the present invention may be implemented on other operating systems having analogous components, whether or not they use the same terminology. For example, should another operating system have an entity that operates as a file object, it could be interpreted as a file object regardless of its actual title.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 12:
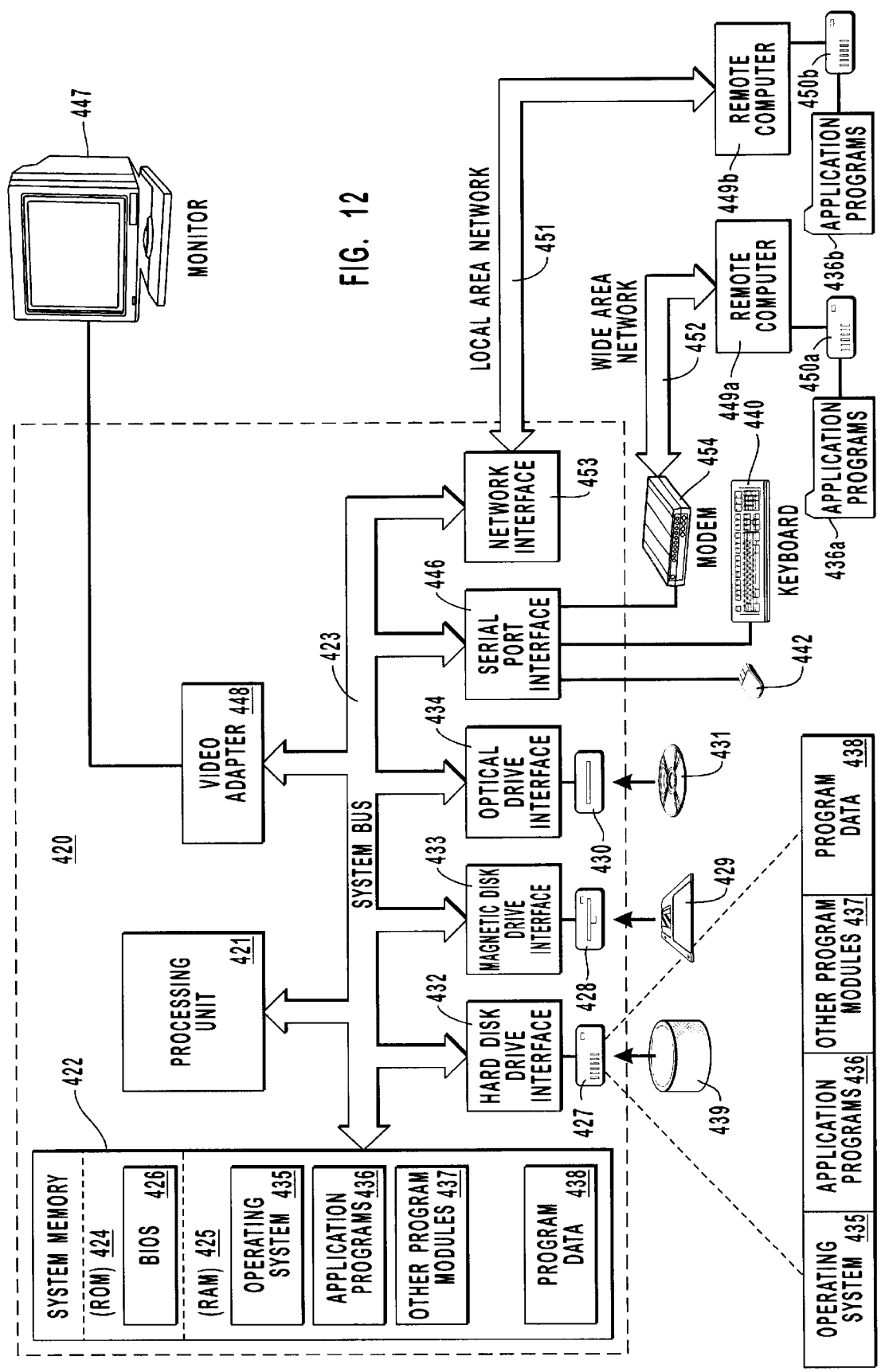
FIG. 12 illustrates an exemplary system that provides a suitable operating environment for the present invention.

FIG. 12 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 12, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically includes many or all of the elements described above relative to the computer 420, although only memory storage devices 450a and 450b and their associated application programs 436a and 436b have been illustrated in FIG. 12. The logical connections depicted in FIG. 12 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

Referring now to FIG. 1, an example system is presented for reading a stream of sound data from a disk drive and rendering that sound data so that it may be heard through a speaker according to the prior art model. An amount of data is stored on hard drive 20 representing sound in the form of digitized sound samples. Alternatively, the source of the sound data stream may be digitized information coming over a phone line, digitized information from network or other communication packets, or other sources known in the art. The data stream is composed of digitized samples having time interval information associated therewith either by data format and convention or by explicit timestamp information attached to each sample. A kernel mode disk driver 22 interacts with the disk drive hardware 20 and is under control of a user mode reader program component 24. A controlling agent 26 manages the different components in order to effectuate the rendering of the sound data and may include dynamic graph building capabilities so that the different software components may be dynamically allocated in order to provide custom filtering or other processing paths as designated by an end user.

The reader component 24 interacts with disk driver 22 using a standard I/O control interface of the operating system and causes the compressed sound data to be read from the disk drive 20 into buffers allocated in user mode as part of the user mode process address space. Next, a decompressor component 28 decompresses the compressed data into its decompressed format for processing. As shown, this step is done entirely in user mode with the attendant lower priority and process behavior safety mechanisms.

The effects component 30 operates on the data to provide some special effect and has an accompanying effects filter 32 operating in kernel mode. Furthermore, an effects processor 34 may be present or the effects filter may operate entirely in software emulating the actual hardware processor. In order to access the effects filter 32, the effects component 30 uses the system I/O control mechanism to transfer the data and control to the effects filter. Again, the kernel mode/user mode boundary is crossed in order to make this transition.

The effects filter 32 controls the effects processor 34 and causes whatever special effect is necessary or desired to be made on the data. This may entail copying all the data from the effects component 30 down to the effects filter 32 and again to the effects processor 34 depending on actual system configuration. While many software effects components have a hardware processor associated therewith, others function entirely within system software running on the host processor.

After control and the data are transferred back into user mode at the completion of the processing of the effects component 30, they are then transferred to sound rendering component 36. The sound rendering component 36 transfers the control and data to the sound rendering driver 38, which in turn controls the sound card 40 in order to render the data, as processed and filtered, as sound through speaker 42. As can be readily seen, there exists a variety of transfers between user mode and kernel mode that add inefficiencies to the rendering of the sound data. Because of the timing sensitive nature of multimedia data. such as a continuous stream of sound or video, it is advantageous to reduce these inefficiencies and transitions of control as well as the multiple copying of data between different buffers.

One embodiment of the present invention can be included, for example, in a service provided on the Windows NT operating system architecture. This service is broken into different software components that a user of the system can access. First, a user mode API is available, which includes a routine for creating connection pin instances and other file objects representing particular functionality, such as a clock mechanism or a buffer allocation mechanism. Additionally, and more importantly, there is a complete set of routines and data structures to assist the driver developer in making drivers that are compliant with the standardized architecture. By utilizing such facilities from the system, different driver developers may create compliant drivers that interact with one another according to the specified architecture. User mode agents communicate with compliant drivers through an environment subsystem running in user mode that communicates with the system services of the NT executive and the I/O manager. This is the same standard I/O mechanism for all other I/O, and a present implementation of the invention utilizes existing system services as much as possible.

Figure 2:
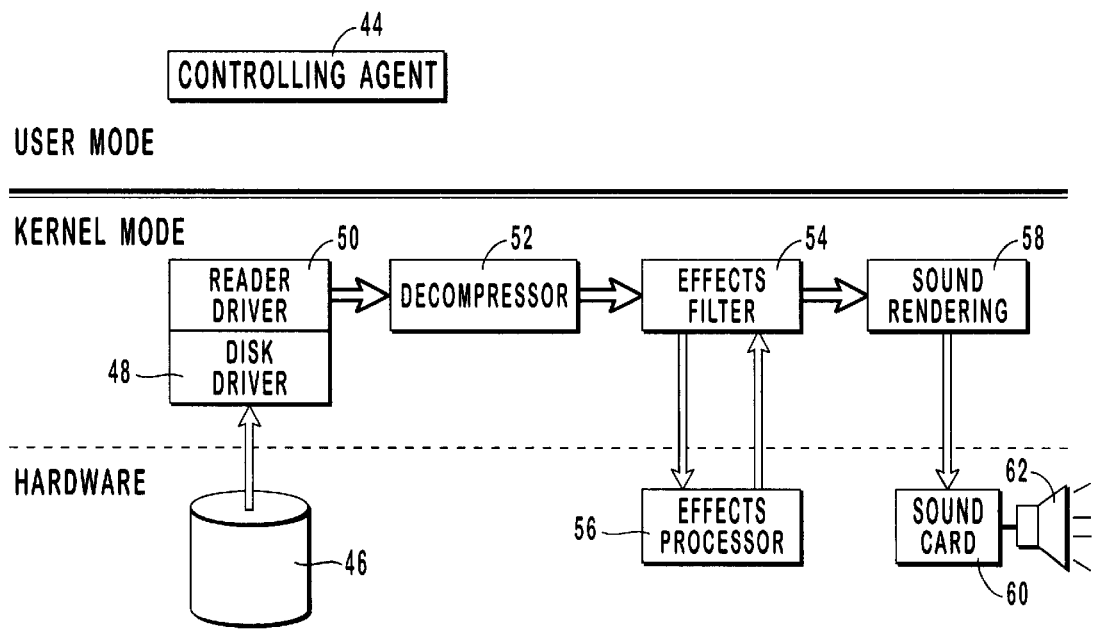
FIG. 2 shows a system according to the present invention having the same purpose as that shown in FIG. 1 to read sound data from a disk drive, process that data. and render that data to be heard on a speaker, wherein the processing filters and rendering are handled by interconnected kernel mode drivers, again under the direction of a controlling agent.

The architecture of the system of FIG. 1 utilizing the present invention appears as shown in FIG. 2. A controlling agent 44 queries the known drivers in order to then make interconnections according to data format and connection format to effectuate the rendering entirely in kernel mode. Furthermore, the controlling agent receives notifications of important events so that it may exercise control as necessary. Examples of such events would include end of processing, a data starvation situation, etc.

In this configuration, the sound data is read from disk drive 46 by the disk driver 48, as before. A reader driver 50 controls disk driver 48 and is "vertically" associated with disk driver 48 according to the NT layered I/O architecture as used in conventional fashion. The terms vertically and horizontally are used to distinguish driver connections that currently occur as part of the NT layered I/O architecture (vertical) and connections according to the interconnected kernel mode drivers made dynamically by a third party controlling agent (horizontal).

Reader driver 50 is also interconnected "horizontally" to a decompressor driver 52 according to the connection methods explained hereafter and is managed by the controlling agent 44. Decompressor 52 performs the decompression in kernel mode before passing the data and control to the effects filter 54. The effects filter applies the special effects utilizing an effects processor 56 as necessary before passing the data and control to the sound rendering driver 58 that controls the sound card and causes the data to be rendered as sound on speaker 62. As can be noted by reference to FIG. 2, keeping processing in kernel mode represents an efficiency advantage by eliminating multiple transitions between user mode and kernel mode and by reducing the amount of overhead normally associated with processing in user mode.

III. Hierarchical Relationship of Objects

Figure 3:
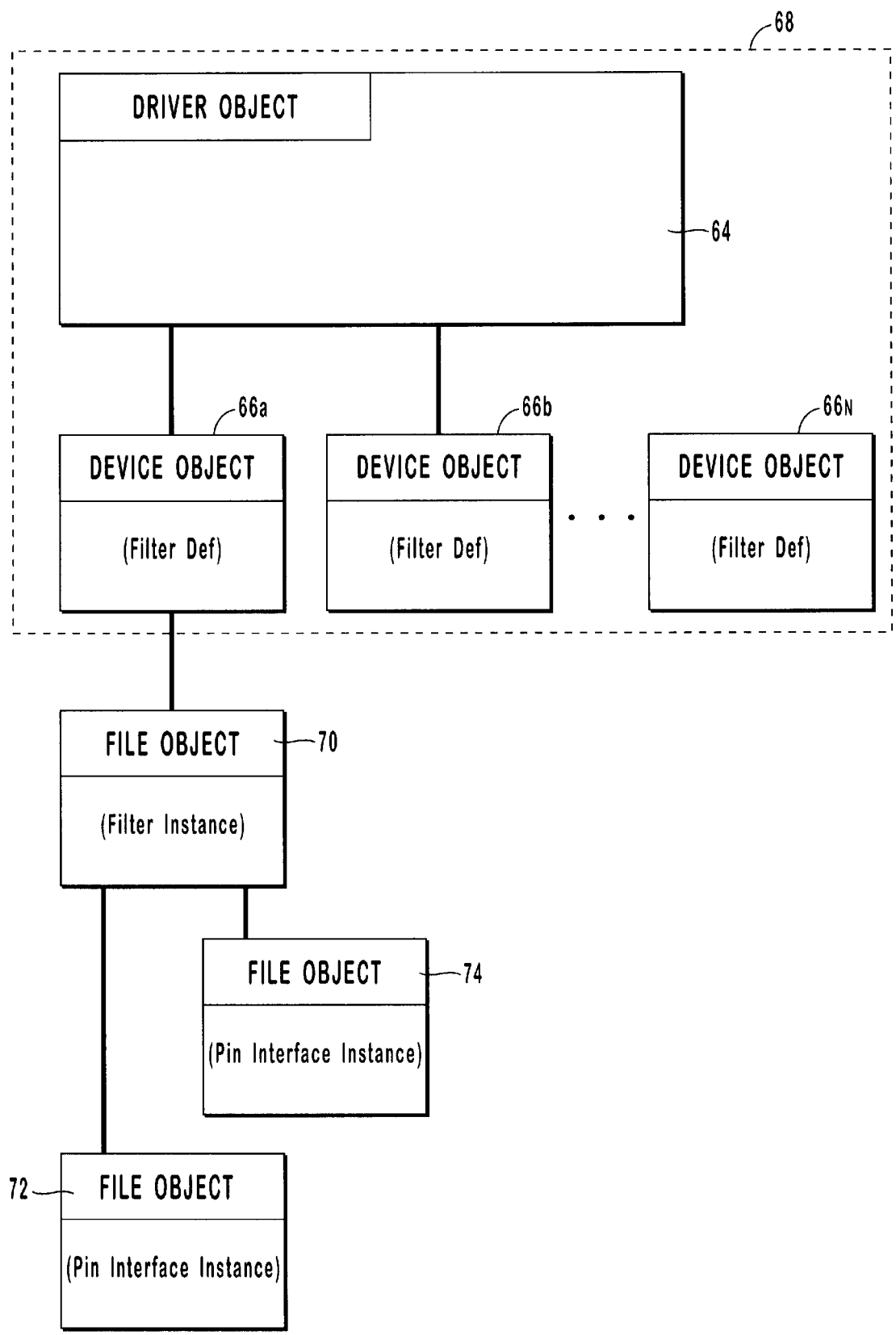
FIG. 3 is a vertical relationship model showing the relationships between driver objects, device objects and file objects as created and used in an operating system.

Referring now to FIG. 3, a logical diagram showing the hierarchal nature of system objects related to interconnected software drivers compliant with one embodiment of the present invention is shown. A driver object 64 is created to represent the executable software code image as loaded in memory. The driver code image contains the entirety of the driver's functionality, and the driver object 64 includes information regarding the image, such as its location on the system, the kinds of devices supported, etc.

For each type of independently accessible functionality by a controlling agent, device objects 66a–66n are created in the I/O directory structure representing the different available functions that can be accessed by user mode clients. These typically represent filters or other portions of functionality independently available. The driver object 64 and the device objects 66a–66n are created upon installation of the driver code as represented by the enclosing box 68.

Historically, a device object has existed for each element of physical hardware. The flexibility in modern I/O systems, however, allows a device object to represent a filter implemented entirely in software. As such, device objects may be readily created for each instance of a filter implemented solely in software. A software filter may therefore be implemented so that each instance as represented by a device object has a one-to-one correspondence with a device object or a single device object may follow the more traditional approach and manage multiple file objects, with each file object representing a client instance of the filter.

Upon a device object, as shown for device object 66a, file objects are created representing independent instances of the functionality represented by device object. While a device object represents a filter and may manage multiple instances of that filter, a file object represents the actual instance of that filter used by a particular entity. Therefore, file object 70 is an instance of the filter defined by device object 66a.

To use a filter, the controlling agent or other user mode client opens a file on a device available in the I/O directory structure. A file object with appropriate context information is created and a handle to that file object returned to the user mode client. While file objects may be hierarchically related by specifying a "parent" file object during creation, file objects also have a sibling relationship, in that they are all children of the same device object.

Context information within a file object consists of information to manage the I/O interface with user mode clients, the "state" of the entity that the file object represents, etc. The context information has system-required information and further includes user-definable areas that can be given special meaning. An example of how the user-definable area can be used will be shown hereafter discussing the implementation of a validation and IRP routing method.

In order to provide connection pin instances, the file object 70 representing a filter instance is used as a parent in creating children file objects representing the connection pin instances for a particular filter. While file object 70 is queried for the connection pin factory definitions and availability, actual file objects are created for each instance of such a pin factory, using the particular file object as the appropriate informational context in order to validly and correctly create the connection pin instance. For example, file objects 72 and 74 represent connection pin instances for the filter represented by file object 70 and are hierarchically related to file object 70. The connection pin instances, as represented by file object 72 and 74, respectively, may be a data path into and then out of the filter instance (represented by file object 70) which can be used for connecting to other connection pin instances in forming a series of chained filters or other driver functionality.

Just as a pin instance is represented by a file object having a hierarchical relationship to another file object representing the filter instance in order to provide context information for the pin instance, other file objects may be hierarchically related to a pin instance in order to represent other functionality so that proper context information is available. Context information is necessary to distinguish one pin instance from another according to the individual parameters used in creation, such as pin data format, communication type, etc.

Other operational entities, such as a buffer allocation mechanism, a timing mechanism, etc., requiring either an individual context or user mode control through a handle may also be represented by file objects. Furthermore, hierarchical relationships between the file objects (e.g., a buffer allocation mechanism associated with a particular connection pin instance) may be established if necessary by specifying a parent file object during creation of the child file object. These parent/child relationships exist to determine relationship and structure between the file objects representing the operational entities. Additionally, a particular type of "parent" file object can only produce certain types of "children" file objects, thus requiring the creation validation mechanisms as explained hereafter. Again, such file objects have corresponding handles available in user mode that are returned to a client through a system API call such as NtCreateFile.

The handles to file objects are used by user mode clients, such as a controlling agent, to communicate with the kernel mode drivers. The hierarchical chain of file objects, device objects, and driver objects allows the I/O subsystem to traverse back to the driver object through the hierarchically related file objects and device objects to arrive at the entry points into the actual driver code. Such entry points are references (e.g., pointers) to functions in the software driver code. Furthermore, each of the objects in the object pathway between a particular file object and the driver object having the entry points to the software driver code provides important context information for the I/O subsystem in creating IRPs as well references into data structures used for properly routing IRPs according to the routing and validation mechanism explained hereafter.

Handles for file objects and other system objects are process-specific and are the means by which a user mode process communicates with an underlying object. It is interesting to note that multiple handles may be created to reference a single underlying system object, such as a file object. This means that multiple applications may be feeding information to a pin instance as represented by a file object.

One element of information that is important for interconnecting different drivers is the device object stack depth parameter. This indicates the IRP stack location of a particular driver object. In this manner, a single IRP may be used and passed between interconnected drivers using the I/O manager, thereby providing a performance enhancement over separately creating and sending IRPs between the various interconnected drivers. Alternatively, each driver could create through appropriate I/O manager calls new IRPs for each successive communication and cause each new IRP to be sent to the next driver in the chain of interconnected drivers.

IV. Validation of Objtect Creation and Message Routing

Figure 4A:
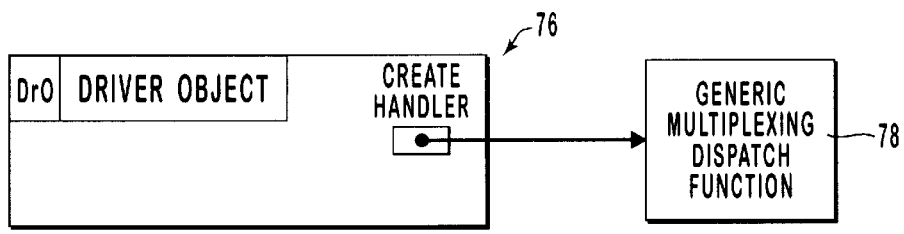
FIGS. 4A, 4B and 4C are logical block diagrams of a driver object, device object, and file object, respectively, showing their logical relationship with the data structures and program code to route messages to appropriate process handling code and to validate the creation of new file objects according to the system of the present invention.
Figure 4B:
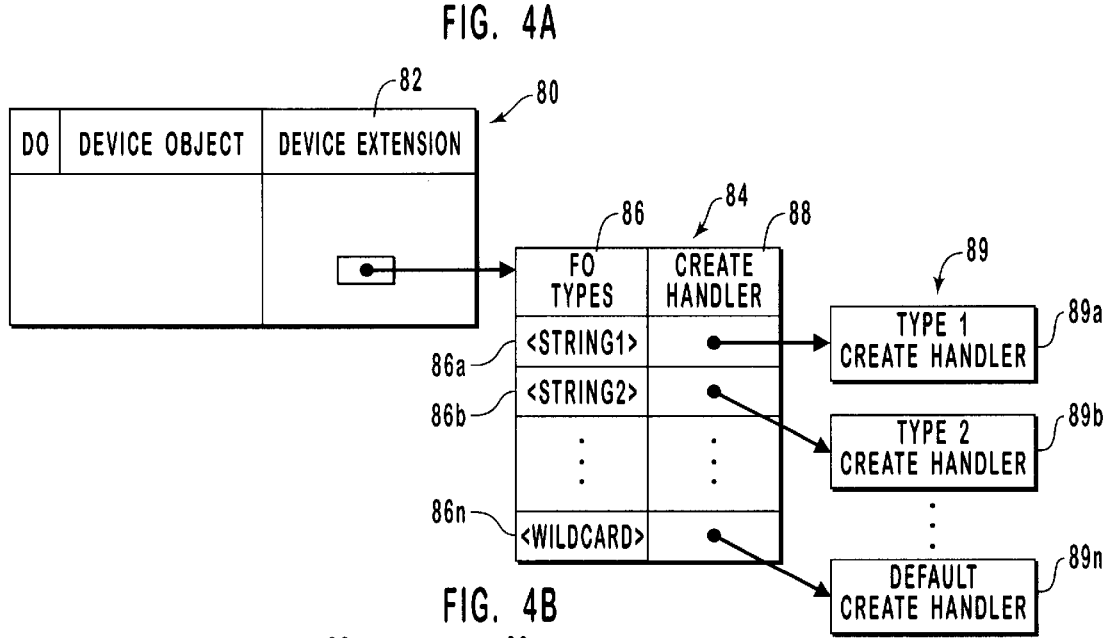
Figure 4C:
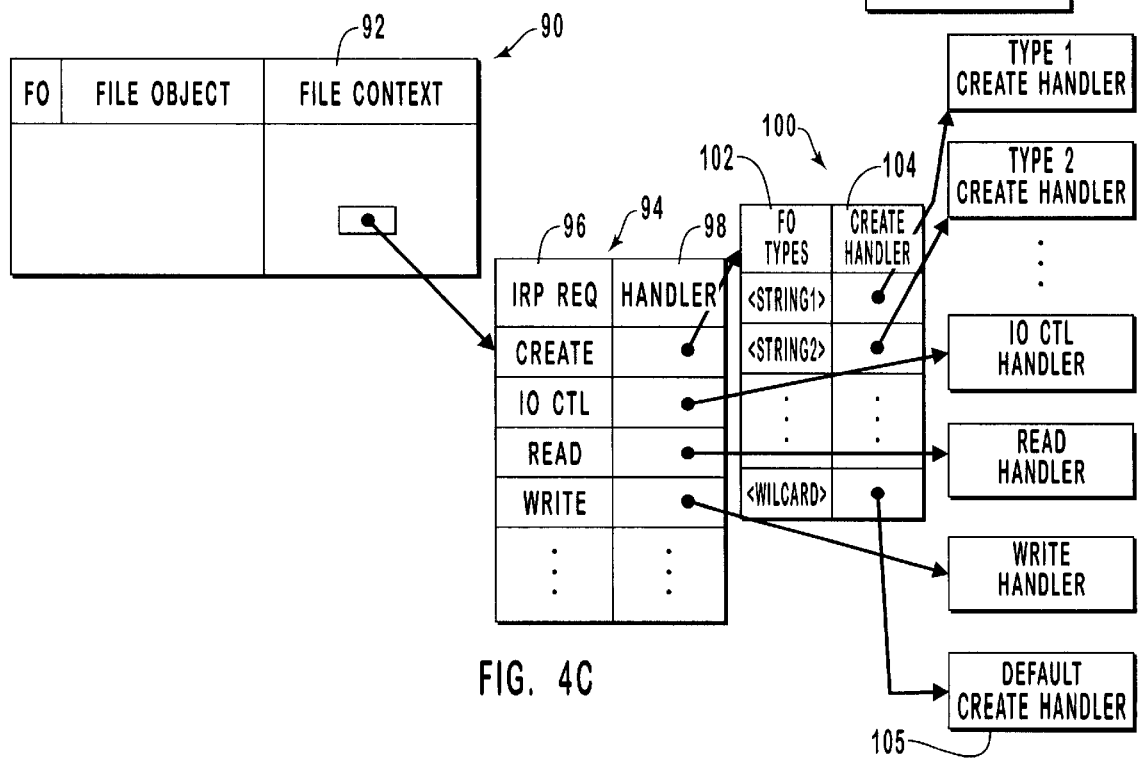

Referring now to FIGS. 4A–4C, extensions to the system driver objects, device objects, and file objects are shown that allow validation of file object creation of differing types as well as I/O Request Packet (IRP) routing to appropriate handlers. FIG. 4A shows a driver object 76 representing the executable code implementing one or more filters or other driver functionality. Within the driver object, the Windows NT architecture requires a reference to a create handler provided by the software driver developer. According to this embodiment, a multiplexing dispatch function 78 is referenced from the driver object 76 as the create handler and is used to route messages to particular create handlers depending on the file object type to be created. Operation of the multiplexing dispatch function 78 will be explained in connection with the flow chart shown in FIG. 6 hereinafter.

In like manner, other handlers from the driver object indicate a multiplexing dispatch function arid, depending on implementation, they may be the same function. In other words, as explained in more detail below, each type of I/O handler reference (e.g., read, write, device control, etc.) points to a multiplexing dispatch function that uses the extension data in a device object and the context information in a file object in order to route the message to the appropriate handler. The extension data in the device object that references a validation table is used when no parent file object is specified on a create operation. Otherwise, the parent file object context information indicates the correct validation table.

FIG. 4B shows a device object 80 which has a particular device extension area 82 that can be utilized as desired by the driver developer and includes driver specific information. At a defined location within the device extension area 82 of the device object 80 is a reference to a data structure, known as a file type validation table 84, containing string representations of file object types 86 or other file object type identifiers. File type validation table 84 also includes create handler codes 88 referencing the associated create handlers 89a–n for each file type represented. The create multiplexing dispatch function utilizes the file type validation table 84 to validate the file object type to be created and then turns control over to the appropriate create handler as will be explained in detail hereafter in connection with the discussion of FIG. 6. For example, if a create request specifies a file object type that matches <STRING1> 86a, file type validation table 84 indicates that the requested file object type is valid and results in Type 1 create handler 89a being used to create the requested file object. The string to be validated is found in the IRP create request and originates from the file name string used with the NtCreateFile function call in user mode. The NtCreateFile call is made within the user mode function cell to create a pin instance or other mechanism.

In one embodiment of the invention, the list of file object types 86 included in file type validation table 84 includes an entry 86n that is treated as a wildcard. For example, entry 86n can be one without a name (i.e., having a null value) or that otherwise specifies the entry as a wildcard. When a message specifies a file object type that does not match one of the file object type identifiers 86 (e.g., identifiers 86a and 86b) specifically enumerated in file type validation table 84, wildcard entry 86n is invoked, which has a reference to a default create handler 89n as illustrated in FIG. 4B. Default create handler 89n can be used to create a file object having a default type. Alternatively, file type validation table can be constructed without a wildcard entry 86n, in which case an error condition message is returned and the create request is rejected when the file object type specified by the create request does not match a specifically enumerated file object type.

FIG. 4C shows a file object 90 having a file context area 92 that is free to be used by the software driver developer. Reference is made from the file context area 92 to an IRP request handler table 94. The different types of IRP requests 96 are associated with references to particular handlers 98, and the appropriate multiplexing dispatch function uses this information to access the correct handler. In the case of determining the correct create handler, a data structure known as a file type validation table 100 is referenced having string representations of file object types 102 or other file object type identifiers and references 104 to the associated create handlers for each file type represented. For children file objects (i.e., file objects that have another file object rather than a device object as parent), the type is represented by a string that is compared to the strings in the file object types 102.

File type validation table 100 of FIG. 4C can be similar in structure and use to file type validation table 84 of FIG. 4B. For example, when a match is found using file type validation table 100 of FIG. 4B, the create handler that corresponds to the matched file object type string is accessed using a reference from the references 104. If no match is found with any of the file object types specifically enumerated in the list of file object types 102, the wildcard entry in the list is used to refer to a default create handler 105. As described above in reference to FIG. 4B, file type validation table 100 can alternatively be constructed without a wildcard entry, in which case an error condition message is returned and the create request is rejected when the file object type specified by the create request does not match a specifically enumerated file object type 102.

In one embodiment, the entries in file type validation tables 84 and 104 can be constructed dynamically. For example, a single driver source can be used to support multiple versions of a particular piece of hardware. In this case, the file object type entries 86 and 96 can be created at runtime rather than being permanently defined. One advantage of dynamically modifiable entries in the file type validation tables is that plug and play functionality can be supported for different versions of hardware.

The invention also extends to computer-readable media having stored thereon data structures, such as the file type validation tables 84 and 100 of FIGS. 4B and 4C, respectively. Such data structures can be defined as having a plurality of data fields containing various data or information that has the functionality disclosed herein for validating the creation of file objects.

Figure 11:
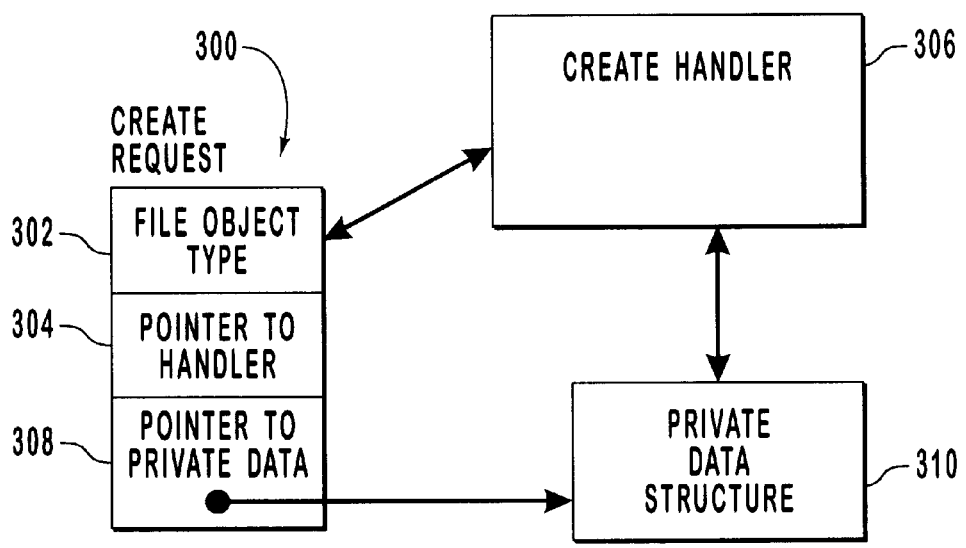
FIG. 11 is a logical diagram showing a create request having a pointer to a private data structure.

FIG. 11 illustrates an exemplary create file object request according to one embodiment of the invention. In this example, the create file object request 300 includes a file object type identifier 302, which can be a string that is compared to strings representing file object types included in file type validation tables as described above in reference to FIGS. 4B and 4C. The create file object request 300 can also include a pointer 304 to the appropriate create handler 306 that is adapted for creating file objects of the specified type.

In this embodiment, create file object request 300 also includes a pointer 308 to a private data structure 310. Private data structure 310 can be constructed by a third party driver developer or by any other individual and can include, for instance, parameters or attributes that are to be applied to the creation of the requested file object. When create handler 306 is invoked, pointer 308 operates to provide the create handler with access to private data structure 310, including any type-specific data contained therein. The invention can be practiced without providing the functionality associated with private data structure 310 and pointer 308. However, supporting create file object requests 300 as shown in FIG. 11 allows for greater flexibility in creating file objects while maintaining the standardized framework disclosed herein for validating file object creation requests.

Figure 5:
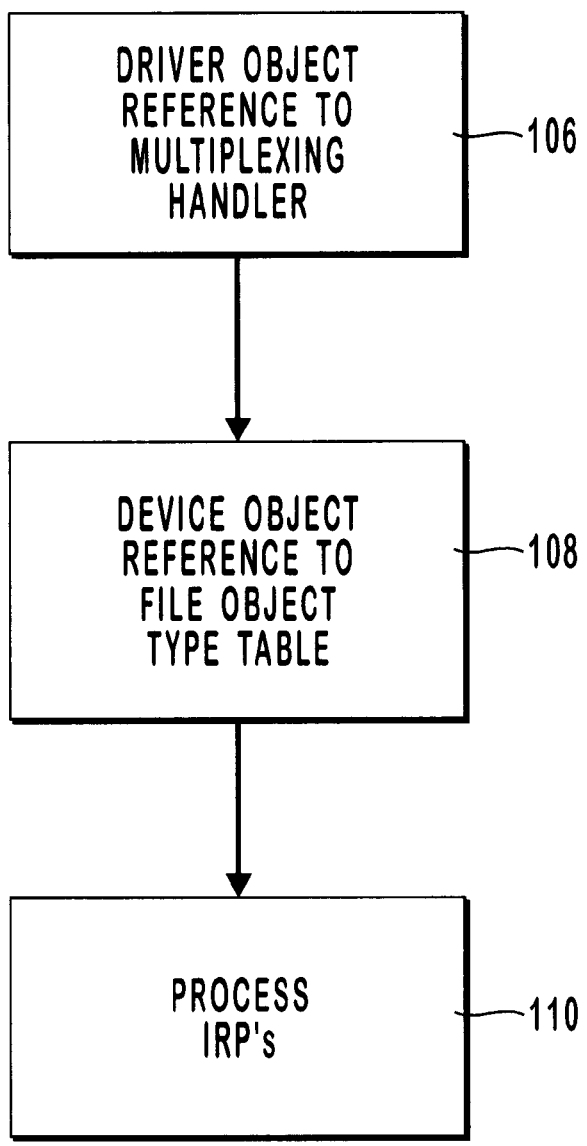
FIG. 5 is a flowchart showing the initial set up of the routing and validation componentry and the processing of I/O messages by the kernel mode drivers.

Referring now to FIG. 5, the installation procedure for setting up the creation validation and mechanism is shown. At step 106, the installing program makes reference in the driver object to the appropriate multiplexing dispatch functions. As shown in FIG. 4A, the create handler points to a generic multiplexing dispatch function. In like manner, all other handler references in the driver object 76 would point to other generic multiplexing dispatch functions germane to the particular handler as necessary. Alternatively, each handler reference could point to the same multiplexing dispatch function that could in turn process the IRP request and route it to the appropriate handler. Such an alternative multiplexing function is necessarily more complex in order to accommodate different kinds of request (e.g., create, write, etc.).

Next, at step 108, each device object created as part of the software driver executable code installation is adjusted to reference the file type validation table 84 as shown in FIG. 4B. Finally, at step 110, the processing of IRP requests begins with the multiplexing dispatch function using the file type validation table 84 as referenced from the appropriate device object 80

When a file object is created, the appropriate IRP dispatch table 94 is created and referenced along with the indexed file object type validation table 100 as necessary. The creation of the file object type validation tables occurs within the provided create handlers according to file object type. The data structures are created representing the IRP dispatch table 94 and the file object type validation table 100 and a reference thereto stored at a specific location with the file context information 92 of the particular file object 90 being created.

Figure 6:
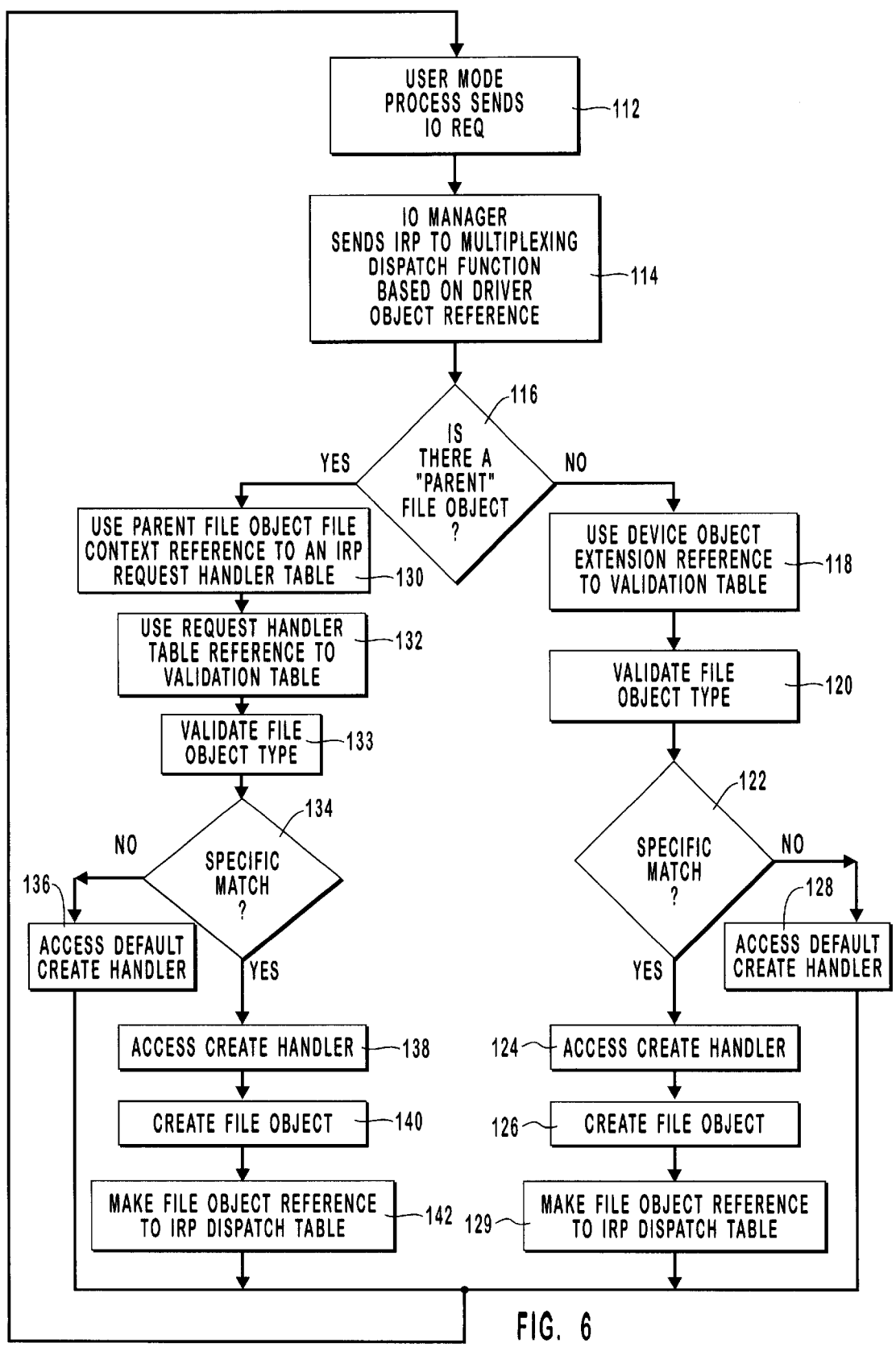
FIG. 6 is a flowchart showing in more detail the processing of a controlling agent, the routing and validation mechanisms, and specific create handler routines for creating a new file object.

Referring now to FIG. 6, a flow chart is presented showing the operation of the create multiplexing dispatch function and its validation mechanism including its interaction with the data structures referenced from the system driver objects, device objects, and file objects. At step 112, a user mode process sends an I/O request for creating a file object. This I/O create request is made, for example, using an invocation to the system API for NtCreateFile. At step 114, the I/O manager sends the IRP to the multiplexing dispatch function 78 based on the reference in the driver object 76 (see FIG. 4A).

Once the multiplexing dispatch function 78 has the IRP for the create request, a test is made at step 116 to determine if there is a parent file object. The information necessary to make this determination can be found within the IRP itself and is originally supplied by the user mode process. The user mode supplies a handle referencing the "parent" file object as part of the create request and the NT system creates the IRP having the correct reference to the "parent" file object.

If there is no parent file object, the right branch is taken, and the multiplexing dispatch function 78 uses the device extension 82 from the appropriate device object 80 to reference a file type validation table 84 (see FIG. 4B) at step 118. Using the validation table 84, the multiplexing dispatch function 78 validates the file object type at step 120 by comparing the string in the request with the strings corresponding to file object types 86. The flow chart of FIG. 6 assumes that the file type validation tables 84 and 100 referenced by the multiplexing dispatch function have wildcard entries that are invoked when the file object type specified by the string in the request does not match any file object string 86 or 102 specifically enumerated in the file type validation tables. Thus, step 120 refers to determining whether the string in the request matches a string corresponding to a specifically enumerated file object type 86.

If there is a matching string as determined at step 122, the appropriate create handler is accessed at step 124. The create handler as accessed at step 124 creates, or causes to be created, the file object at step 126. With the created file object, the appropriate create handler in step 129 makes the file object reference in the file context 92 to an IRP dispatch table 94 that it has previously created.

If there is no matching string as determined in step 122, the wildcard entry 86b in the file type validation table 84 is invoked, and the method advances to step 128, in which default handling of the create request is conducted. In the example illustrated in the flow chart of FIG. 6, it is assumed that the wildcard entry 86b results in the default create handler 91 being accessed as shown at step 128. Subsequently, steps 126 and 129 are conducted in the context of the default create handler 91. In an alternative embodiment not illustrated in FIG. 6, the absence of a specific match in step 122 can result in an error message being generated and the create request being rejected.

Returning now to step 116, it may be determined that there is a parent file object present. If a parent file object is present, as found in the IRP associated with the create request, the multiplexing dispatch function 78 uses the file context 92 from the parent file object 90 to reference an IRP dispatch table 94 (see FIG. 4C) at step 130. For a create request, the multiplexing dispatch function 78 accesses a file type validation table 100, at step 132. Using the file type validation table 100, the multiplexing dispatch function 78 validates the file object type at step 133 by comparing the string in the request with the file object types 102 strings, as was done above.

If there is a match between the string in the request and a string corresponding to a specifically enumerated file object type 102 as determined at step 134, the appropriate create handler is accessed at step 138. With the appropriate create handler, the file object is created at 140, and the create handler makes a new IRP dispatch table 94 for the newly created file object and makes reference in the newly created file object file context area 92 to the newly created IRP dispatch table 94 at step 142.

If there is no matching string as determined in step 134, the wildcard entry in the file type validation table 100 is invoked, and the method advances to step 136, in which default handling of the create request is conducted as described above in reference to step 128. Subsequently, steps 140 and 142 are conducted in the context of the default create handler. As also explained above, an alternative embodiment can involve an error message and rejecting the create request in the absence of a specific match in step 134.

Note that the same file object structure as shown in FIG. 4C is used to explain interaction with both the parent file object and the validly created child file object. While the same structure exists in both cases (once the new file object is created), they are used differently and contain different information.

Whenever a connection pin instance is created, a connection pin ID is passed that identifies the pin factory in the filter that "supports" the creation of the pin instance. Those skilled in the art will note that the connection pin ID may also be validated as a string in a validation table in much the same manner as the file object is validated and that other implementation variations exist.

In order to make connections between different drivers, a common mechanism must be present to ensure that a given driver supports such interconnections. This common mechanism must allow discovery of filter capabilities including connection pin factory capabilities. Furthermore, such a mechanism should also be extensible to provide additional flexibility to driver developers.

One mechanism chosen in the present embodiment for defining compliant drivers and allowing discovery of capabilities are identified "sets" of related items. This is a convenient mechanism to be used with existing I/O communication mechanisms. A set is logically defined as having a GUID (globally unique identifier) to identify the set as a whole and a RUID (relatively unique identifier, e.g., relative within the set itself) for each element of functionality within the set. The set identifier and any other data structures necessary for operating with the chosen RUID item are passed as part of an I/O control call using the filter handle as a parameter. Only a small number of IOCTLs need to be allocated in order to implement a full system of functionality. As implemented, three different types of sets are established depending on their functions, requiring a total of four IOCTLs. Other implementations may use sets in a different manner. The particular IOCTL signals the handler for I/O control to interpret or use the chosen element (using the RUID) in a certain manner. Furthermore, control flags may be passed with the GUID and RUID to further specify control information.

The first set type is a property set and is used in connection with values or settings found within the driver or on any associated hardware. Examples of such settings would be transfer rate, volume level, etc. One IOCTL is associated with property sets with a control flag differentiating between a "get" property and a "set" property command. In this manner the same data structure can be used to either set or get a particular property with the driver determining the action required based on the IOCTL used. The correct property is identified by the set identifier consisting of its unique GUID and RUID combination.

Method sets are another type of set used and are a set of actions that can be performed by a driver. Only one IOCTL is needed to identify the method set with the correct method to be actuated identified by the unique GUID and RUID combination for the set identifier. Methods are used to control the driver and include such functions as initializing the driver for use, clearing buffers, etc.

Event sets are used for managing events associated with driver processing, such as device change notification, data starvation notification, etc., or any other notification defined by the set that may be useful to a user mode application. Two IOCTLs are used, one for enabling a specified event and one for disabling a specified event, while any data structures necessary for a given event identified by a RUID can be shared whether enabling or disabling the event.

To use a set, an I/O control operation is initiated using the specified IOCTL and reference to a data structure having the set GUID, RUID, and other necessary data (e.g., control flags, data structures, etc.). For example, setting a volume property on a sound card driver would entail an I/O control operation using a property set IOCTL, a control flag indicating a set property operation, the appropriate GUID for the property set having the volume setting, the specific RUID within that set indicates the volume property, and the new volume setting value.

To query the sets supported, by type, an IOCTL for a particular set type (e.g., property IOCTL, method IOCTL, or event enable IOCTL) having a null GUID and control flags to indicate supported set enumeration are issued as part of an I/O command and a list of set GUIDs supported is returned.

To query supported properties, methods, or events within a given set, the set GUID, set type IOCTL, a null RUID, and control flags indicating enumeration of supported elements are used with the I/O operation. A list of supported RUIDs is returned as a result of the I/O operation. This allows a third party agent to determine which, if any, optional elements of an implemented set are supported.

The written specification of a set uniquely identified by a GUID allows a documented mechanism that both driver developers and third party controlling agents may use as an implementation guide. The third party developer knows of a given driver's capabilities based on response to queries and preprogrammed knowledge based on the abstract set definition. Likewise, a driver developer may use the abstract set definition as a guide to implementing a set or group of sets providing known functionality to any third party agent.

In order to provide the connection abilities described herein, a compliant driver must support certain sets. The following tables illustrate some important kinds of information that may be supported in property set format and that can be used in implementing the present invention. The first table refers to properties about a connection pin factory that would be implemented by a filter, while the second table refers to properties about an actual connection pin instance that would be created by using a particular connection pin factory as a template.

TABLE 1

Filter Properties and Their Use

| Property | Description |
|---|---|
| Connection Pin Factories | Lists the different types of connection pin instances that may be created on a particular filter, each distinguishable type referred to as a pin factory. Note that this is not the total number of connection pin instances which could be instantiated on this device, but the number of unique connection pin types, such as an audio input and audio output. |
| Connection Instances | Lists the number of instances already created of a given connection pin factory as well as the highest number of instances supported for that particular connection pin factory. If the total cannot be determined until the filter is actually connected, this property returns a −1. |
| Data Flow | Lists the possible data flow direction of a connection pin factory with respect to a filter (e.g., into the filter, out of the filter, or either into or out of the filter). |
| Communication | Lists the communication requirements for a given connection pin factory in terms of processing IRPs. Some connection pin factories may not be interconnected but have other forms of control mechanisms associated therewith such as a "bridge" to a file source for data that represents a source point on a graph. The bridge control mechanism would allow setting of a filename indirectly where information is stored.<br>In an exemplary implementation, and agent (which decides which pin factory to use for making a connection pin instance) must be able to understand the intrinsic meaning of a "none", "sink" or input, "source" or output, "both," and "bridge" communication types for a connection pin factory. For example, a source connection pin instance requires a handle or reference to a sink connection pin instance, etc.<br>In the communication type context, sink and source refer to the disposition of the connection pin instance in processing IRPs. A sink would receive the IRPs for processing, while a source would pass the IRPs onto the next appropriate processing component. There are two communication types that are neither sink nor source and represent end points in the connection graph. An end point represents the place where data either enters or exits from the connected filters. A none designation indicates that the connection type may not be instantiated while a bridge communications type refers to an end point that may be instantiated so that specific properties may be manipulated. For example, a bridge end point that is part of a file reader will likely have a property that contains the path and file name of a file that stores the data to be processed. |

TABLE 1-continued

Filter Properties and Their Use

| Property | Description |
| --- | --- |
| Data Ranges | Lists the possible data ranges that a connection pin factory may support, including the format of the data, if relevant. In one implementation, a count followed by an array of data ranges, which the connection pin type may support, is used as part of the property. In that implementation, if different data ranges are supported under different media or interfaces (see below), different connection pin factories are available on a particular filter to accommodate such differences. Furthermore, each data range structure may be extended for format specific detail such as number of bits and channels.<br>The actual data format a connection pin instance uses is set during creation of the instance. The data range property is used to assist in determining what that actual data format should be for a particular connection pin instance and is accessed or queried by a third party controlling agent. |
| Interfaces | Lists other set GUIDs indicating the supported interfaces on a particular connection pin factory. An interface is the type or types of data that may be communicated through a connection pin factory. For example, MIDI data, CD music, MPEG video, etc., would be interfaces in the sense that data has a particular convention and format that a filter could handle. Such interfaces also comprise protocols for submitting the data. An interface is independent of the medium by which it is communicated. |
| Media | Lists the supported media on a particular connection pin factory. A medium is the way or mechanism by which information is transferred, such as IRP-based, sockets, etc. An interface may be defined on top of a variety of different media. In the preferred embodiment and implementation explained herein, an IRP-based medium and file IO- based medium is used. |
| Data Intersection | Returns the first acceptable or "best" data format produced by a connection pin factory given a list of data ranges. This approach is used to allow a third party agent to determine data requirements when chaining different filters together. In one implementation, the data intersection property is used to determine the best data format produced by a connection pin factory given the constraint of a list of data ranges. The list of data ranges may be acquired using the data ranges property on another pin factory that is connected as explained previously.<br>A third party controlling agent, which has no knowledge of the data type specifics, may use the data range list of one connection pin factory and return the "best" (e.g., first acceptable data format) data format on the current connection pin factory. Although a set of ranges of the two intersecting connection pin factories could be returned, only the best format is returned by the driver. In this manner, the third party controlling agent can apply this "best" data format to the next driver in the graph in order to create a virtual set of connections before actually initiating the creation of connection pin instances and connecting the entire graph of filters together. This allows the controlling agent to assess the viability of a particular filter graph selected by a user and point out potential problems to the user before actually connecting the graph. The data format returned can also be restricted by the formats available given the connections already made on the filter.<br>This property is capable of returning an error if a particular data format cannot be determined until an actual connection is made or if an intersection is dependent on multiple data formats on different connection points. Essentially, intersection information is provided, while the property itself returns a data format. |

TABLE 2

Connection Pin Instance Properties and Their Use

| Property | Description |
| --- | --- |
| State | Describes the current state of the connection pin instance. Possible states include being stopped, acquiring data, processing data, being paused or idle, etc. The state represents the current mode of the connection pin instance, and determines the current capabilities and resource usage of the driver.<br>The stop state is the initial state of the connection pin instance, and represents the mode of least resource usage. The stop state also |

TABLE 2-continued

Connection Pin Instance Properties and Their Use

| Property | Description |
|---|---|
| | represents a point where there is the most latency in data processing in order to arrive at the run state. The acquire state represents the mode at which resources are acquired (such as buffer allocators) though no data may be transferred in this state. The pause state represents the mode of most resource usage and a correspondingly low processing latency to arrive at a run state. Data may be transferred or "prerolled" in this state, though this is not actually a run state. The run state represents a mode where data is actually consumed or produced (i.e., transferred and processed) at a connection pin instance.<br>More resolution in control may be accomplished using custom properties depending on the purpose of the filter and the underlying hardware. For example, in order to make an external laser disk player spin up, one would set some sort of custom "mode" property specific to that class. Setting this property may also change the state of the device but not necessarily, depending on the effect of the mode. |
| Priority | Describes the priority of the connection pin instance for receiving access to resources managed by the filter and is used by the filter in resource allocation arbitration. This property, if supported, allows a third party controlling agent to indicate the priority placement of the particular pin instance relative to all other connection pin instances of all other drivers which may share limited resources with this particular connection and instance.<br>This priority property may also be implemented to allow an agent to set finer tuning of the priority within a single class of priority. For example, a priority may have certain subclasses associated therewith. If two drivers competing for the same resources have the same priority class, then the subclass priority is used to determine resource allocation between the two drivers. If the subclass priority is also the same, then arbitrarily, the first connection pin instance receives the resources. |
| Data Format | Used to get or set the data format for the connection pin instance. |

The previous tables are given by way of example and not by limitation, and those skilled in the art will appreciate that many different properties and schemes may be implemented in order to create the connections between different drivers. One important element is the standardization factor so that different driver manufacturers or development groups may create drivers that may be interconnected since they are able to implement the same property sets.

Another useful property set gives topology information for the internal relationships of input and output connection pin factories on a given filter. This information states the relationship of input pin factories and corresponding output pin factories on a given filter as well as what type of processing happens between the input and output pin factories. Examples of the processing that occurs would be different data transformations, data decompression, echo cancellation, etc. Such information is useful to an automated filter graph builder that traces a hypothetical connection path using multiple filters before making actual connection pin instances and connections. Essentially, the topology information explains the internal structure of the filter and exposes this through a property set mechanism to inquiries from third party agents.

Therefore, a compliant driver is simply one that implements the designated property set. This allows a third party controlling agent to make queries and settings to the compliant filter once it is determined that a given property set is supported. The overall goal is to acquire enough information on how to connect the differing filters together in order to form a filter graph.

By using the generic set mechanism, a minimum of functionality may be implemented to support a compliant driver but still allow unlimited extensibility. A set may be defined in a written specification that can be independently coded by a multitude of different driver developers to create a system of interoperable and interconnectable drivers as long as particular sets are implemented. Furthermore, the specification can define mandatory properties, methods, and events that must be supported as well as optional properties, methods, and events that can be implemented depending on the driver functions and advanced capabilities. Besides the basic minimum commonality required, driver developers may incorporate additional functionality by defining their own sets and assigning them a GUID.

Figure 7:
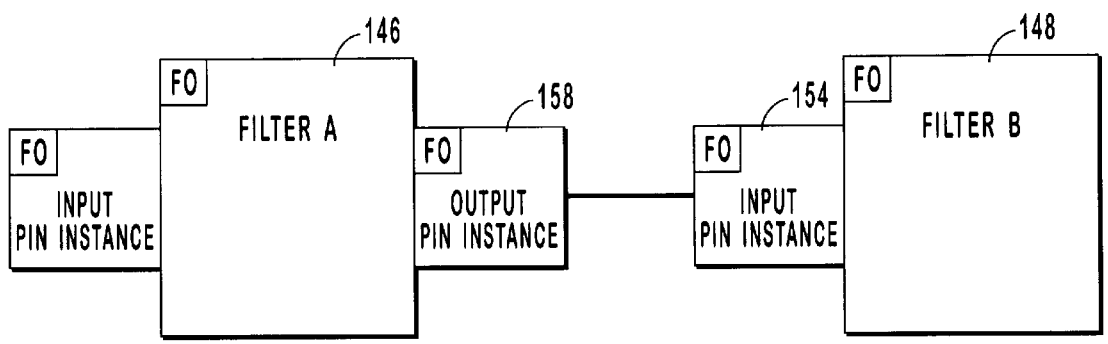
FIG. 7 is a logical diagram showing the horizontal relationship between connected filters utilizing the file object structures in an operating system to effectuate such a connection in a standardized fashion.
Figure 8:
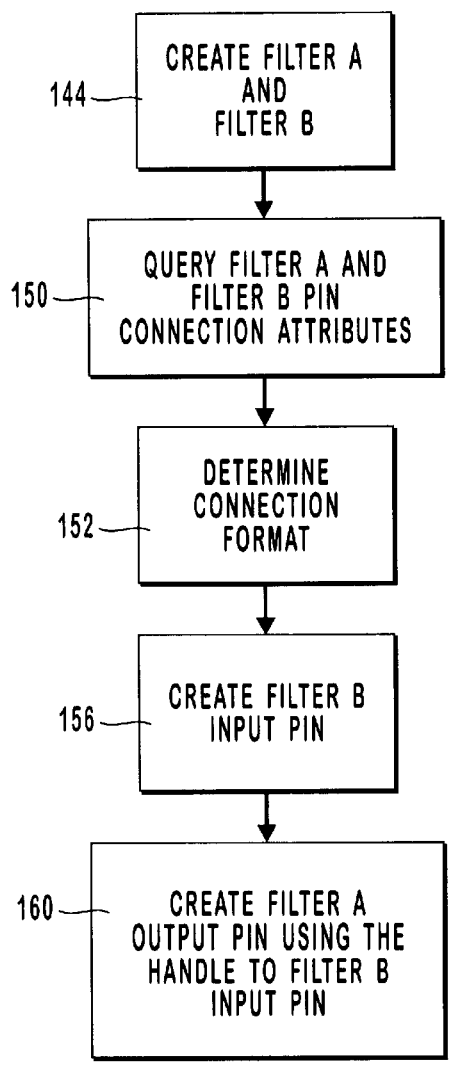
FIG. 8 is a flowchart showing the processing steps taken by a controlling agent in user mode to create and connect the kernel mode filters or drivers of FIG. 7 in order to effectuate a connection for processing I/O requests received from the controlling agent with processing continuing between different drivers (filters).

Referring now to FIGS. 7 and 8, an illustration of the process for connecting two kernel mode filters is illustrated. FIG. 7 shows a logical block description wherein each filter instance and connection pin instance is represented by file objects. FIG. 8 is a flow chart illustrating the steps to creating the file objects and the appropriate connections.

Beginning at step 144, an instance of Filter A 146 and an instance of Filter B 148 are created by a user mode agent. These are created using standard file system API for creating files with a particular device. Filter A 146 and Filter B 148 are compliant filters or drivers because of their implementing the appropriate property, method, and event sets to support the creation of connection pin instances and for querying the respective filter's capabilities in terms of sets supported and connection pin factories defined for that filter.

The third party controlling agent then queries Filter A 146 and Filter B 148, respectively, at step 150 to determine connection pin factories available and the attributes for connection pin instances that may be created therefrom. These attributes include, as mentioned previously, the connection format and the data format for each individual type of pin instance for each respective filter 146 and 148. The querying is accomplished using the set based query mechanisms explained in detail previously.

After querying such information, the third party controlling agent determines the optimal connection format based on the ranges of data formats and connection formats previously queried. This determination occurs at step 152 and places in the third party agent the ability to use the same filters in different ways according to the needs of a selected connection path. The third party controlling agent uses the data intersection property, topology information, and connection pin factories on both the filters in order to determine how best to select data format and connection arrangements depending on the actual filter graph being made.

Input filter pin instance 154 is created by the third party agent at step 156 using the optimal detection formation determined at step 152. Since input pin instance 154 is a file object, a handle is returned from the create process, which can be used for delivering I/O requests to the input instance 154. Furthermore, the creation of the input pin instance 154 was validated and uses the routing and validity mechanisms shown previously in discussion with FIGS. 4A–4C, 5, and 6.

In order to finalize the connection, output pin instance 158 is created at step 160 using as a parameter in the NtCreateFile call the handle of the previously created input pin instance 154. The effect of thus creating the output pin instance 158 is to utilize the system file management and I/O management facilities to create an internal IRP stack structure that allows an original write command to be consecutively processed by the variously connected connection pin instances and filters in an appropriate order so as to facilitate direct data flow between the differing filters. This requires that the input pin instance be created prior to the associated output pin instance that will be feeding the input pin instance.

The stack depth parameter of a device object controls how many stack locations are created for an IRP sent to this driver. A stack depth parameter is assumed to be one when a device object is initially created and may be modified thereafter depending on the whether multiple drivers are chained together. In the current system, modification occurs, if necessary, when an output pin instance transitions from the initial "stop" state to the "acquire" or other state. Connection pin instance state transition is the mechanism that determines correct stack depth parameter information for proper IRP creation and treatment.

In order to correctly allocate the internal IRP stack structure for a chained set of connection pin instances, it is necessary to transition the connection pin instances out of the stop state in a specified order; beginning with the last input pin instance (in this case input pin instance 154) and working consecutively backwards to an associated (e.g., connected) output pin instance (in this case output pin instance 158). If many filters are chained together, the deepest filter's or bridge's input pin instance must be the beginning point of transitioning and building successively backwards until the initial output pin instance on a bridge or filter is set. In other words, the transition out of the stop state must occur backwards up the chain so that each connection pin instance gets the stack size needed after the previous connection pin instance. Typically, though not necessarily, a connection pin instance transitions from the stop state to the acquire state and, for discussion purposes hereinafter, transitioning to the acquire state will accomplish the same purpose with respect to stack depth parameter adjustment as transitioning out of the stop state.

Once all pin instances are in the acquire state, stream reads and writes may be issued to the filter graph. It is interesting to note that the system explained herein allows connection of associated input and output pin instances to occur in any order; only the transition from the stop state must occur in bottom up or deepest first fashion. Furthermore, the filter graph is reconfigurable to allow changes to be made after initial creation. When changes are made, state transitions need only occur on those connection pin instances that are in the stop state in order to assure correct stack depth parameter information.

Connection pin factories found on filters represent places where a filter can consume and/or produce data in a particular format. For example, a particular connection pin factory may support a number of different data formats, such as 16 bit 44 kilohertz PCM audio or 8 bit 22 kilohertz PCM audio. As explained previously, the connection pin factories and their different capabilities such as data format can be queried from the filter using the appropriate property set mechanism and the system I/O facilities. Actual connection pin instances are created based on the information received from the pin factories.

In a streaming environment, where a single stream write or stream read operation from a user mode agent causes successive processing of the data through the connected filters, two main methods for IRP control can be used as part of the native facilities of the NT operating system. First, a separate IRP may be created by each filter and sent to the next filter for processing which in turn creates a new IRP for further processing down the chain. The other method is to use a single IRP and pass it between the successive filters using standard procedures provided for interacting with the I/O manager. If the first method of creating new IRPs for each successive filter in the chain is used, interconnection order between the filters is unimportant since the filter need only know the destination of the IRP in order to call the I/O manager and send the IRP to the designated filter. If an IRP is reused, it is important that the connection pin instance transitions from the stop state be made beginning from the last filter to receive the reused IRP for processing backwards up to the first filter to receive the reused IRP or to the filter that created the IRP for processing.

The current embodiment and implementation of the interconnected kernel mode filters utilizes IRP sharing advantageously to ease complexity in driver development, allow more robust drivers to be created, and provide more efficient processing. The "bottom up" pin instance state transition path ensures that the proper stack order is created in the IRP processed by the successive drivers and that each driver object has the appropriate stack depth parameter set. Furthermore, the current state of the receiving input pin instance is checked in order to assure that the state transition sequence has been properly followed. For this reason, the communications property of a particular connection pin factory determines the potential flow direction and aids in properly distributing the state transition of connection pin instances.

When creating an output pin instance (or IRP source), a reference to a file object representing an input pin instance (or IRP sink) on another filter is passed as part of the NtCreateFile call. The appropriate create handler is executed as explained previously using the multiplexing dispatch function and device object/file object hierarchy. This create handler has access to the device object of the filter having the input pin instance (e.g., Filter B 148 in FIG. 7) by way of the input connection pin instance file object (e.g., input pin instance 154). From the device object, the previous stack depth parameter can be read, and the stack depth parameter of the device object for the filter having the output pin instance may be incremented. For example, the device object associated with Filter A 146 has a stack depth parameter incremented from that of the device object associated with Filter B 148 for the connection illustrated in FIG. 7. This normally occurs when transitioning out of the stop state and IRPs are not forwarded while a connection pin instance is in the stop state.

When a filter processes an IRP, it knows which stack frame or location within the IRP stack to access containing information designated for that particular filter by making reference to and using the stack depth parameter of the associated device object. Furthermore, the current filter prepares the IRP for the next filter in the processing chain by decrementing the device object stack depth parameter to locate the next filters IRP stack location.

The filter code is responsible for preparing the next location in the IRP stack and for calling the I/O manager to pass the IRP to the next filter as designated. In this manner, the filter may designate which file object representing a particular connection pin instance is to receive the IRP and the associated data for processing. Hence, the standard I/O manager calls such as IoAttachDevice to stack the respective device objects for sequential processing of IRPs are not used.

It is noteworthy that creating a connection between connection pin instances does not imply creating new device objects to represent the connection. A single underlying device object is used to support an instance of a filter and all connection pin instances on that filter. Specific information necessary for proper data processing is kept within the context area of the file object allowing the context information to be preserved while non-page memory use is kept at a minimum. It is also noteworthy that while an IRP-based medium has been illustrated, other media for communication between the interconnected filters may be used, such as direct function calls on non-host hardware-to-hardware communication.

Figure 9B:
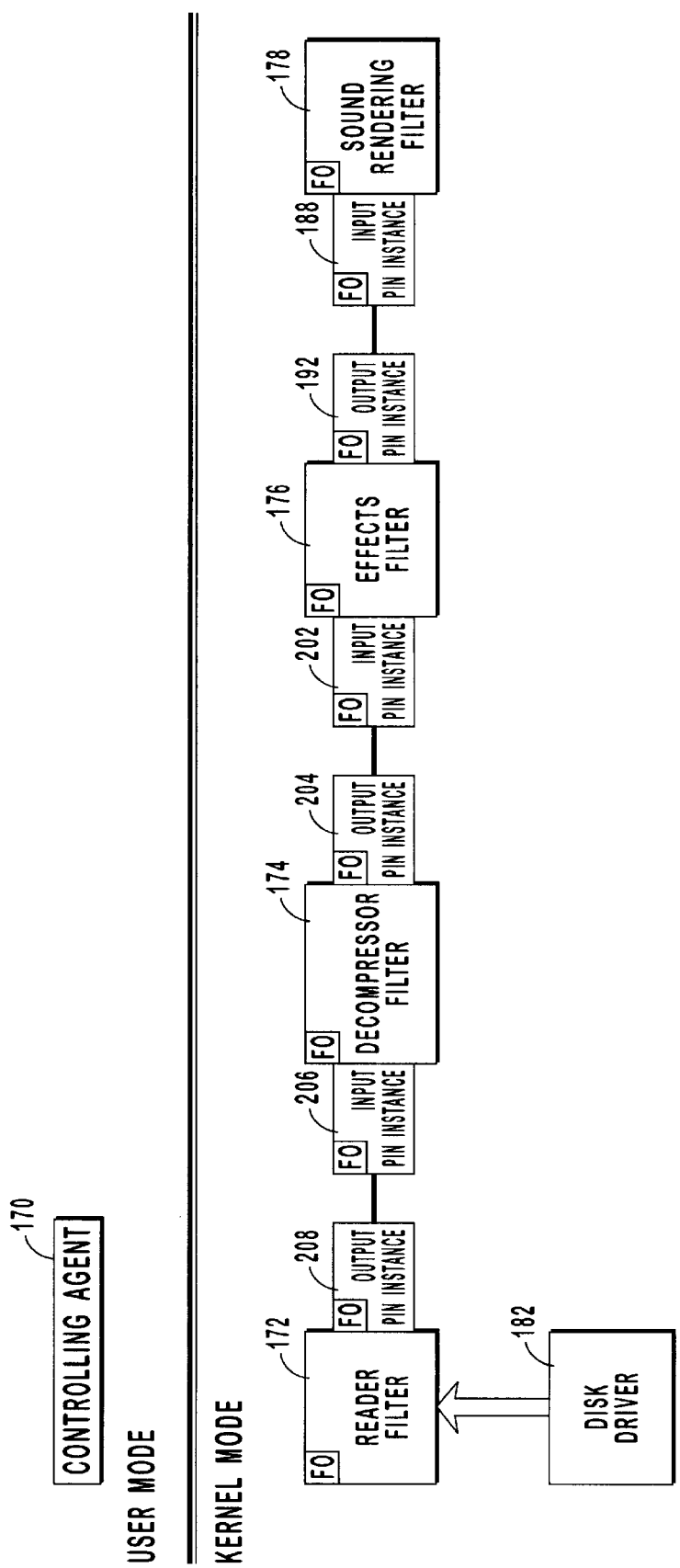
Figure 10:
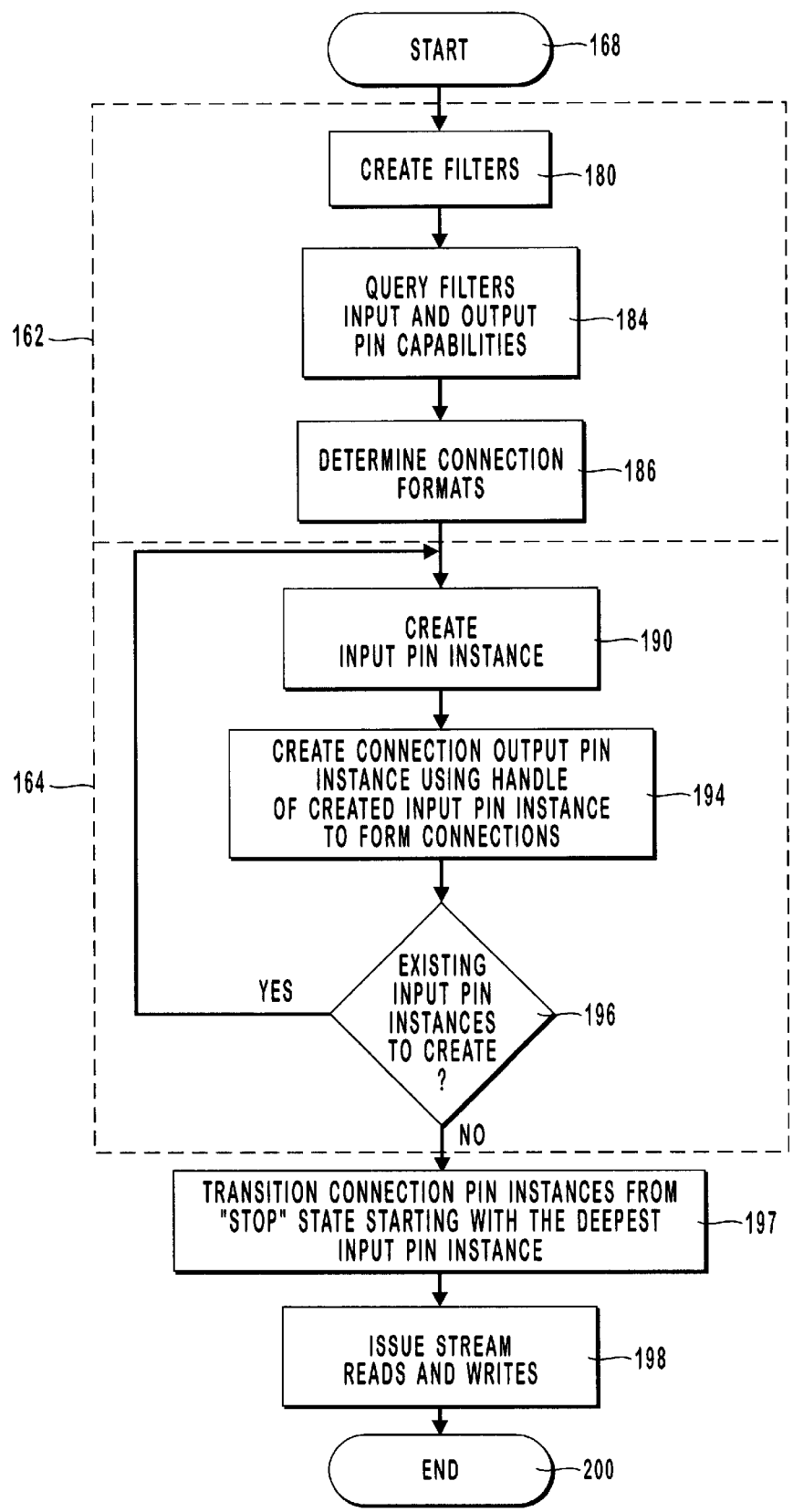
FIG. 10 is a flowchart showing the processing steps for creating the interconnected kernel mode drivers for the system shown in FIGS. 9A and 9B.

Referring now to FIGS. 9A–9B and FIG. 10, the proper creation, connection, and state transition order of the software drivers as shown in FIG. 1 (prior art) and FIG. 2 (higher level logical diagram of the interconnected kernel mode drivers) are presented. FIG. 9A illustrates the logical structure encompassed by box 162 and the processing steps contained therein. FIG. 9B shows the creation of the connection pin instances to complete the interconnection of kernel mode filters and comprises the processing steps encompassed by box 164 on the flow chart shown in FIG. 10.

When in the state of FIG. 9B, having all interconnections made, the kernel mode filter system is ready for reads and writes in order to effectuate processing. The I/O system uses the IRP stack information properly set by the correct state transition process in order to pass the stream reads and writes onto the differing filter elements by way of their respective connection pin instances. It may be noted that some external software other than the agent used to create the graph, including a bridge or filter itself, as well as hardware can provide data for the stream reads and writes.

After beginning at step 168, the controlling agent 170 creates instances of reader filter 172, decompressor filter 174, effects filter 176, and sound rendering filter 178 at step 180. Furthermore, attachment is made between reader filter 172 and a disk driver 182 in order to bring the data in from off of the disk drive. Creation of each filter instance is achieved by the user mode controlling agent 170 by using standard I/O calls to open a file on the appropriate device as found in the device I/O directory hierarchy. Such a call returns a handle to a file object representing the instance of each filter.

At step 184, the third party agent queries the effects filter 172, the decompressor filter 174, the effects filter 176, and the sound rendering filter 178 to determine the connection pin factory capabilities. These capabilities include what kinds of input and output pin instances may be created, how many instances of each connection pin factory the particular filter supports, the data format supported on each connection pin factory, the medium or type of communication path, etc. The capabilities are "queried" using the property set mechanism explained in more detail previously and the kernel mode filters are presumed to be compliant to the architecture since they support appropriate "sets" (e.g., property set).

All such query information at step 184 is used to determine if a chained connection path is possible between the respective filters by creating and connecting the appropriate connection pin instances. The third party agent determines the types of pin instances needed for interconnection in order to make a filter graph to accomplish a given purpose.

The determination of the connection format based on the supported data formats is determined at step 186. Using the topology information, data format, and data intersection properties on the filter, a hypothetical filter graph may be created. Since connection order is not significant, this need not be done but could save time when trying to build a filter graph. Should this hypothetical filter graph be created without error, the third party agent is assured that creating an interconnecting connection pin instances can be done with reliability. Because some queries return errors unless an actual pin instance is created, it may be necessary to create such connection pin instances before a hypothetical filter graph that returns a reliable indication of viability can be created. Again, the hypothetical filter graph may be tested before any interconnections take place.

Once the correct connection information is known, as determined at step 186, the input pin instances may be created and interconnected and as represented by the loop of processing steps enclosed by box 164 on FIG. 10. This loop contains processing steps that begin at the input pin instance furthest away from the source of the data stream. This last input pin instance is referred to as the "deepest" pin instance and may be created first, followed by the output pin instance associated therewith. A connection, therefore, is the creation of an output pin instance using the handle of a previously created input pin instance.

The pattern continues, with every input pin instance created successively afterwards prior to connection with the associated output pin instance. Such a connection scenario is given by way of example and is not to be limiting of other possible ways of connecting the respective output and input pin instances to form a connection between kernel mode filters according to the present system. The filters may be connected in any order according to implementation as long as the handle from the input pin instance is used during creation of the connected output pin instance on another filter. Furthermore, as explained previously, changes may be made to the filter graph after initial creation (and even use).

In the first iteration of the loop, input pin instance 188 is created at step 190. After receiving the handle from the create function, the third party controlling agent 170 uses that handle as a parameter in an NtCreateFile call in order to create output pin instance 192 at step 194. By doing this through the first iteration, the sound rendering filter 178 is effectively connected to the effects filter 176 through the corresponding connection pin instances 188 and 192, respectively. In the current implementation, the NtCreateFile call is "wrapped" as part of a function call in an API made available to the user mode clients. This relieves the user mode developer of third party agents from needing to know as much detail and allows all relevant functionality be concentrated in a single user mode API.

At step 196, the third party agent determines if there is any other existing input pin instances to be created. If there are, an input pin instance must be created followed by the corresponding output pin instance on another filter. Eventually, all connections are made and the third party controlling agent 170 prepares the filter graph for streamed data processing.

In this fashion, input pin instance 202 is created on the second iteration of the loop enclosed in box 164 at step 190 while the output pin instance 204 uses the handle of input pin instance 202 as part of its creation at step 194. Finally, on the third and final iteration for this particular example, input pin instance 206 is created, followed by output pin instance 208 to finalize the connection.

At step 197, the third party controlling agent 170 transitions each connection pin instance from the stop state to the acquire state in preparation for streamed data processing through the filter graph. To correctly set the stack depth parameter in each of the device objects for the respective filters, it is necessary to make the state transition beginning with the "deepest" or last connection pin instance (e.g., the last input pin instance to receive data for processing) and sequentially moving "up" the chain of interconnected kernel mode filters until arriving at the first connection pin instance (e.g., the first output pin instance that provides data into the graph). The first filter or bridge creates the IRP with enough stack locations allocated so that the IRP may be passed successively through each kernel mode filter in the graph in an efficient manner.

Finally, the third part controlling agent 170 issues the stream reads and writes in order to process the data at step 198 before ending at step 200.

As explained previously, each creation of an output pin instance requires the handle of a file object representing the input pin instance to be connected thereto. This file object reference allows the create handler for the output pin instance to save a reference to the device object corresponding to the input pin instance for current or future access.

More particularly, this allows the stack depth parameter of the device object managing the input pin instance to be accessed by the driver of the output pin instance during state transition from the stop state to the acquire or other state. The value of the stack depth parameter associated with the input pin instance is accessed, incremented, and saved into the stack depth parameter for the device object corresponding to the output pin instance.

The stack depth parameter is used to determine where in the shared IRP stack structure the stack frame information is located for a particular filter and is different for each filter. By so interconnecting the filters and making the state transition in proper sequence, a single IRP may be passed down the chain of interconnected filters in kernel mode with no necessary communication into user mode.

It may be noted that it is possible to have multiple instances based on the same connection pin factory. For example, an audio mixing filter may mix multiple input pin instances into a single output pin instance in terms of processing. Each input instance is of the same type and the filter may only support one type of input pin. Such an arrangement would also be an example of having multiple inputs to a single output.

The converse is also true wherein a splitter filter may have a single input connection pin instance while providing multiple output pin instances thereby multiplying streams of data. Those skilled in the art will note that many variations and useful combinations can be made from the connection mechanism explained herein according to actual implementation and the needs thereof.

The uniformity and standardization achieved by requiring all compliant filters to support a common mechanism (e.g., property sets, methods sets, and event sets) that can be independently implemented by driver developers allows a controlling agent to conveniently connect compliant filters provided by various different software providers. Furthermore, many of the facilities in terms of connection pin factories needed in one circumstance may not be needed in another circumstance. A determination of the necessary connection pin instances is made initially by the third party controlling agent that makes the actual interconnections between different filters.

Those skilled in the art will recognize that the methods of the present invention may be incorporated as computer instructions stored as a computer program code means on a computer readable medium such as a magnetic disk, CD-ROM, and other media common in the art or that may yet be developed. Furthermore, important data structures found in computer hardware memory may be created due to operation of such computer program code means.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Ptent is:

1. In a computer having an operating system, a method of validating the creation of file objects in a standardized manner so as to eliminate the need for third party driver developers to write validation code, the method comprising the acts of:

receiving, at a driver object associated with the operating system, a request to create a requested file object of a particular type;

accessing a file type validation table that includes:
file object type identifiers representing valid file object types, the file type validation table referencing create handlers associated with the file object type identifiers; and
a wildcard entry, the file type validation table further referencing a default create handler associated with the wildcard entry;

comparing the particular type of file object specified in the request with the file object type identifiers in the file type validation table;

if the particular type matches one of the file object type identifiers, then using the create handler associated with the matched file object type identifier to create the requested file object; and if the particular type does not match one of the file object type identifiers, then using the default create handler associated with the wildcard entry to create a file object having a default file object type.

2. A method as recited in claim 1, further comprising the act of sending the received request to a multiplexing dispatch function which is resident as part of the operating system, as opposed to being provided by a third party driver developer, the multiplexing dispatch function then performing the act of accessing the file type validation table.

3. A method as recited in claim 2, wherein the multiplexing dispatch function is one of several multiplexing functions germane to the particular request received by the driver object.

4. A method as recited in claim 1, wherein the file object type identifiers constitute string data.

5. A method as recited in claim 4, wherein the wildcard entry is a file object type identifier having a null value.

6. A method as recited in claim 1, wherein the operating system comprises:
   said driver object, wherein said driver object manages a software driver as a system resource;
   one or more device objects each defining a software driver's functionality and availability to other operating system resources and each including a private area containing a file type validation table; and
   one or more file objects for managing invocation of an operating system resource as specified by a particular device object and each of which includes a private area containing an IRP request handler table and a file type validation table, wherein the file objects are hierarchically related to parent objects that may consist of either device objects or other file objects.

7. A method as recited in claim 6, wherein the request received at the driver object includes information enabling a determination of whether the parent object of the requested file object is another file object or a device object.

8. A method as recited in claim 7, further comprising the act of using the private area of the parent file object to reference an IRP request handler table if the parent object is another file object.

9. A method as recited in claim 8, wherein the file type validation table accessed in the act of accessing is referenced in the IRP request handler table.

10. A method as recited in claim 1, further comprising the act of dynamically constructing the file type validation table, including selecting the particular file object type identifiers included in the file type validation table, prior to the act of receiving request.

11. A method as recited in claim 10, wherein the act of dynamically constructing the file type validation table is conducted in response to a piece of hardware being installed at the computer.

12. A method as recited in claim 1, wherein the request includes data referencing a private data structure including at least one of parameters and attributes associated with the requested file object, the act of using the create handler associated with the matched file object type identifier to create the requested file object comprising the act of accessing the private data structure by the create handler as the requested file object is created.

13. A computer-readable medium having stored thereon a data structure representing a file type validation table for enabling validation of the creation of a file object in response to a request for creation of the file object, the file type validation table being capable of enabling validation of the creation of the file object in a standardized manner that eliminates the need for third party driver developers to write validation code, data structure comprising:

first data fields containing file object type identifiers representing valid file object types;

second data fields containing data referencing create handlers associated with the file object type identifiers contained in the first data fields, the first data fields and second data fields being constructed such that an appropriate create handler is selected and accessed when the particular file object type of a requested file object specified in the request matches one of the file object type identifiers;

a wildcard data field containing wildcard data that is invoked when the particular file object type of the requested file object does not match one of the file object type identifiers contained in the first data fields; and a default create handler field referencing a default create handler, the default create handler being selected and accessed when the wildcard data is invoked.

14. A computer-readable medium as recited in claim 13, wherein the file object type identifiers constitute string data.

15. A computer-readable medium as recited in claim 13, wherein the wildcard data has a null value.

16. In a computer having an operating system, a method of validating the creation of file objects in a computer in a standardized manner so as to eliminate the need for third party driver developers to write validation code, the method comprising the acts of:

receiving, at a driver object associated with the operating system, a request to create a requested file object of a particular type, the request including data referencing a private data structure;

accessing a file type validation table that includes file object type identifiers representing valid file object types, the file type validation table referencing create handlers associated with the file object type identifiers comparing the particular type of file object specified in the request with the file object type identifiers in the file type validation table and determining that the particular type matches a particular file object type identifier;

accessing the create handler associated with the particular file object type identifier;

using the data in the request, passing at least a portion of the private data structure to the accessed create handler; and creating the requested file object using the accessed create handler.

17. A method as recited in claim 16, wherein the private data structure contains at least one of parameters and attributes associated with the requested file object.

18. A method as recited in claim 16, further comprising the act of sending the received request to a multiplexing dispatch function which is resident as part of the operating system, as opposed to being provided by a third party driver developer, the multiplexing dispatch function then performing the act of accessing the file type validation table.

19. A method as recited in claim 18, wherein the private data structure is provided by a third party as opposed to being resident as part of the operating system.

20. A method as recited in claim 16, wherein the operating system comprises:
   said driver object, wherein said driver object manages a software driver as a system resource;
   one or more device objects each defining a software driver's functionality and availability to other operating system resources and each including a private area containing a file type validation table; and one or more file objects for managing invocation of an operating system resource as specified by a particular device object and each of which includes a private area containing an IRP request handler table and a file type validation table, wherein the file objects are hierarchically related to parent objects that may consist of either device objects or other file objects.

21. A method as recited in claim 20, wherein the request received at the driver object includes information enabling a determination of whether the parent object of the requested file object is another file object or a device object.

22. A method as recited in claim 21, further comprising the act of using the private area of the parent file object to reference an IRP request handier table if the parent object is another file object.

* * * * *

UNITED STATES PATENT AND TRADEMARK OFFICE
CERTIFICATE OF CORRECTION

PATENT NO. : 6,643,712 B1
DATED : November 4, 2003
INVENTOR(S) : Shaw et al.

It is certified that error appears in the above-identified patent and that said Letters Patent is hereby corrected as shown below:

Column 1,
Lines 38 and 45, after "Windows NT" please insert -- ™ --

Column 4,
Line 29, after "that data" please change "." to -- , --

Column 6,
Line 40, after "Windows NT" please insert -- ™ --

Column 9,
Line 43, after "multimedia data" please change "." to -- , --
Line 49, after "NT" please insert -- ™ --

Column 12,
Line 11, after "as well" please insert -- as --
Line 34, after "Validation of" please change "Objtect" to -- Object --
Line 44, after "NT" please insert -- ™ --
Line 53, after "function" please change "arid" to -- and --

Column 14,
Line 57, after "80" please insert -- . --

Column 18,
Table 1, line 22, after "implemetation," please change "and" to -- an --

Column 30,
Line 35, after "identifiers" please insert -- ; --

Signed and Sealed this

Twentieth Day of July, 2004

JON W. DUDAS
*Acting Director of the United States Patent and Trademark Office*